(12) United States Patent
Bradwell et al.

(10) Patent No.: US 12,224,447 B2
(45) Date of Patent: Feb. 11, 2025

(54) HIGH TEMPERATURE ENERGY STORAGE SYSTEMS AND METHODS

(71) Applicant: Ambri Inc., Marlborough, MA (US)

(72) Inventors: David J. Bradwell, Arlington, MA (US); Zachary T. Modest, Jamaica Plain, MA (US); Alex Elliott, Billerica, MA (US); Adam Briggs, Sherborn, MA (US); Nick Trombetta, Lunenburg, MA (US); Daniel M. Holzer, Medford, CA (US)

(73) Assignee: AMBRI INC., Marlborough, MA (US)

( * ) Notice: Subject to any disclaimer, the term of this patent is extended or adjusted under 35 U.S.C. 154(b) by 534 days.

(21) Appl. No.: 17/344,527

(22) Filed: Jun. 10, 2021

(65) Prior Publication Data

US 2022/0013835 A1 Jan. 13, 2022

Related U.S. Application Data

(63) Continuation of application No. PCT/US2019/066231, filed on Dec. 13, 2019.

(Continued)

(51) Int. Cl.
*H01M 50/183* (2021.01)
*B65B 1/04* (2006.01)
(Continued)

(52) U.S. Cl.
CPC ............. *H01M 50/183* (2021.01); *B65B 1/04* (2013.01); *H01M 50/204* (2021.01);
(Continued)

(58) Field of Classification Search
CPC ............. H01M 50/204; H01M 50/271; H01M 50/218; H01M 50/233; H01M 50/251;
(Continued)

(56) References Cited

U.S. PATENT DOCUMENTS 11,374 A 7/1854 Leue
2,587,443 A 2/1952 Crabtree
(Continued)

FOREIGN PATENT DOCUMENTS

AU 2014229643 A1 9/2015
AU 2016225020 A1 9/2017
(Continued)

OTHER PUBLICATIONS

Advisory Action Before Filing of Appeal Brief dated May 10, 2012 for U.S. Appl. No. 12/839,130.
(Continued)

*Primary Examiner* — Matthew W Van Oudenaren
(74) *Attorney, Agent, or Firm* — WILSON SONSINI GOODRICH & ROSATI

(57) ABSTRACT

The present disclosure provides energy storage systems that can be manufactured with lower cost. The energy storage system may comprise a plurality of electrochemical cells, a rack placed in an enclosure to support the plurality of electrochemical cells, one or more panels between the rack and the enclosure to form one or more insulation sections, and insulation material disposed in the one or more insulation sections.

17 Claims, 11 Drawing Sheets

Related U.S. Application Data

(60) Provisional application No. 62/780,857, filed on Dec. 17, 2018.

(51) Int. Cl.
  *H01M 10/39* (2006.01)
  *H01M 10/658* (2014.01)
  *H01M 50/204* (2021.01)
  *H01M 50/218* (2021.01)
  *H01M 50/22* (2021.01)
  *H01M 50/233* (2021.01)
  *H01M 50/24* (2021.01)
  *H01M 50/242* (2021.01)
  *H01M 50/253* (2021.01)
  *H01M 50/271* (2021.01)

(52) U.S. Cl.
  CPC .......... *H01M 50/271* (2021.01); *H01M 10/39* (2013.01); *H01M 10/399* (2013.01); *H01M 10/658* (2015.04); *H01M 50/218* (2021.01); *H01M 50/22* (2021.01); *H01M 50/233* (2021.01); *H01M 50/24* (2021.01); *H01M 50/242* (2021.01); *H01M 50/253* (2021.01)

(58) Field of Classification Search
  CPC ............. H01M 50/253; H01M 50/209; H01M 50/207; H01M 50/211; H01M 50/213; H01M 50/216; H01M 50/22; H01M 50/24; H01M 50/242; H01M 10/39; H01M 10/6556; H01M 10/658; H01M 10/399
  See application file for complete search history.

(56) References Cited

U.S. PATENT DOCUMENTS

| | | |
|---|---|---|
| 3,057,946 A | 10/1962 | Eidensohn |
| 3,238,437 A | 3/1966 | Foster et al. |
| 3,245,836 A | 4/1966 | Agruss |
| 3,404,035 A | 10/1968 | Kummer et al. |
| 3,419,432 A | 12/1968 | Hesson |
| 3,488,221 A | 1/1970 | Hiroshi et al. |
| 3,507,703 A | 4/1970 | Laszlo |
| 3,535,214 A | 10/1970 | Rene |
| 3,588,573 A | 6/1971 | Chen et al. |
| 3,607,405 A | 9/1971 | Christopher |
| 3,607,407 A | 9/1971 | Adams |
| 3,635,765 A | 1/1972 | Greenberg |
| 3,663,295 A | 5/1972 | Baker |
| 3,666,560 A | 5/1972 | Cairns et al. |
| 3,716,409 A | 2/1973 | Cairns et al. |
| 3,770,506 A | 11/1973 | Rightmire et al. |
| 3,775,181 A | 11/1973 | Ryerson |
| 3,833,420 A | 9/1974 | Will |
| 3,833,421 A | 9/1974 | Rubischko et al. |
| 3,833,422 A | 9/1974 | Will et al. |
| 3,837,918 A | 9/1974 | Nakabayashi |
| 3,839,779 A | 10/1974 | Walker |
| 3,870,561 A | 3/1975 | Charbonnier et al. |
| 3,877,984 A | 4/1975 | Werth |
| 3,878,296 A | 4/1975 | Vine et al. |
| 3,884,715 A | 5/1975 | Gay et al. |
| 3,887,396 A | 6/1975 | Walsh et al. |
| 3,898,096 A | 8/1975 | Heredy et al. |
| 3,907,589 A | 9/1975 | Gay et al. |
| 3,915,742 A | 10/1975 | Battles et al. |
| 3,926,673 A | 12/1975 | Saridakis |
| 3,930,888 A | 1/1976 | Bowser et al. |
| 3,933,521 A | 1/1976 | Vissers et al. |
| 3,941,612 A | 3/1976 | Steunenberg et al. |
| 3,947,291 A | 3/1976 | Yao et al. |
| 3,954,504 A | 5/1976 | Zellhoefer |
| 3,959,012 A | 5/1976 | Liang et al. |
| 3,960,594 A | 6/1976 | Fritz et al. |
| 3,969,139 A | 7/1976 | Lai |
| 3,980,495 A | 9/1976 | Roche et al. |
| 3,988,164 A | 10/1976 | Liang et al. |
| 4,002,807 A | 1/1977 | Ludwig |
| 4,011,374 A | 3/1977 | Kaun |
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew et al. |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Voinov |
| 4,216,273 A | 8/1980 | Cadart et al. |
| 4,238,553 A | 12/1980 | Gerlach et al. |
| 4,265,984 A | 5/1981 | Kaye |
| 4,287,268 A | 9/1981 | Coetzer |
| 4,287,269 A | 9/1981 | Coetzer et al. |
| 4,299,890 A | 11/1981 | Rea et al. |
| 4,315,974 A | 2/1982 | Athearn et al. |
| 4,338,380 A | 7/1982 | Erickson et al. |
| 4,360,574 A | 11/1982 | Park |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco, III |
| H816 H | 9/1990 | Carder et al. |
| 4,954,403 A | 9/1990 | Plichta et al. |
| 4,965,146 A | 10/1990 | McCullough et al. |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,034,290 A | 7/1991 | Sands et al. |
| 5,039,351 A | 8/1991 | Cooper et al. |
| 5,044,551 A | 9/1991 | Tanaka et al. |
| 5,139,895 A | 8/1992 | Roy et al. |
| 5,185,068 A | 2/1993 | Sadoway |
| 5,198,638 A * | 3/1993 | Massacesi ......... H01M 10/6571 219/385 |
| 5,254,232 A | 10/1993 | Sadoway |
| 5,284,562 A | 2/1994 | Beck et al. |
| 5,286,359 A | 2/1994 | Richards et al. |
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |
| 5,491,037 A | 2/1996 | Kawakami |

(56) References Cited

U.S. PATENT DOCUMENTS

| | | |
|---|---|---|
| 5,529,858 A | 6/1996 | Wicker et al. |
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | MacKenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,716,731 A | 2/1998 | Coetzer et al. |
| 5,735,933 A | 4/1998 | Yokoyama et al. |
| 5,737,181 A | 4/1998 | Evans |
| 5,763,117 A | 6/1998 | Wright et al. |
| 5,798,308 A | 8/1998 | Chatterjee et al. |
| 5,807,412 A | 9/1998 | Li et al. |
| 5,834,131 A | 11/1998 | Lutz et al. |
| 5,856,041 A | 1/1999 | Inoue et al. |
| 5,874,183 A | 2/1999 | Uematsu |
| 5,939,221 A | 8/1999 | Tsuchimoto et al. |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,396,380 B1 | 5/2002 | Girke et al. |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,531,846 B1 | 3/2003 | Smith et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,255,937 B2 | 8/2007 | Park |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,554,220 B2 | 6/2009 | Sugawara |
| 7,568,537 B2 | 8/2009 | King et al. |
| 7,578,702 B1 | 8/2009 | Tom et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,858,228 B2 | 12/2010 | Yoon |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,257,868 B2 | 9/2012 | Hagiwara et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,459,314 B2 | 6/2013 | Frazier et al. |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | McBride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |
| 8,764,962 B2 | 7/2014 | Allanore et al. |

(56) References Cited

U.S. PATENT DOCUMENTS

| | | |
|---|---|---|
| 8,766,642 B2 | 7/2014 | Bogdan, Jr. et al. |
| 8,806,866 B2 | 8/2014 | McBride et al. |
| 8,815,445 B2 | 8/2014 | Sugiura et al. |
| 9,000,713 B2 | 4/2015 | Boysen et al. |
| 9,035,617 B2 | 5/2015 | Parakulam et al. |
| 9,076,996 B2 | 7/2015 | Bradwell et al. |
| 9,106,980 B2 | 8/2015 | Parakulam et al. |
| 9,153,803 B2 | 10/2015 | Chung et al. |
| 9,312,522 B2 | 4/2016 | Bradwell et al. |
| 9,437,864 B2 | 9/2016 | Tan et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |
| 9,735,450 B2 | 8/2017 | Bradwell et al. |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,893,385 B1 | 2/2018 | Nayar et al. |
| 9,925,881 B2 | 3/2018 | Manotas et al. |
| 10,270,139 B1 | 4/2019 | Deak et al. |
| 10,297,870 B2 | 5/2019 | Bradwell |
| 10,541,451 B2 | 1/2020 | Bradwell et al. |
| 10,566,662 B1 | 2/2020 | Nayar et al. |
| 10,608,212 B2 | 3/2020 | Bradwell et al. |
| 10,637,015 B2 | 4/2020 | Thompson et al. |
| 10,903,528 B2 | 1/2021 | Ouchi et al. |
| 11,611,112 B2 | 3/2023 | Bradwell et al. |
| 11,677,100 B2 | 6/2023 | Bradwell et al. |
| 11,840,487 B2 | 12/2023 | Bradwell et al. |
| 11,909,004 B2 | 2/2024 | Bradwell et al. |
| 11,929,466 B2 | 3/2024 | Bradwell et al. |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0052646 A1 | 3/2003 | Minamiura et al. |
| 2003/0182791 A1 | 10/2003 | Janmey |
| 2003/0186111 A1 | 10/2003 | Tamakoshi |
| 2003/0196908 A1 | 10/2003 | Brown |
| 2003/0203279 A1 | 10/2003 | Tsukamoto et al. |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1 | 4/2005 | Kairawicz et al. |
| 2005/0237029 A1 | 10/2005 | Takezawa et al. |
| 2005/0238954 A1 | 10/2005 | Kawada |
| 2006/0127735 A1 | 6/2006 | Sabin et al. |
| 2006/0151333 A1 | 7/2006 | Banek |
| 2006/0187614 A1 | 8/2006 | Ushio et al. |
| 2007/0067119 A1 | 3/2007 | Loewen et al. |
| 2007/0087266 A1 | 4/2007 | Bourke et al. |
| 2007/0184711 A1 | 8/2007 | Thrap et al. |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 | 2/2008 | Sadoway et al. |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0241689 A1 | 10/2008 | Takami et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2010/0291443 A1 | 11/2010 | Farmer |
| 2011/0014503 A1 | 1/2011 | Bradwell et al. |
| 2011/0014505 A1 | 1/2011 | Bradwell et al. |
| 2011/0020694 A1 | 1/2011 | Khakhalev et al. |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0144861 A1 | 6/2011 | Lakirovich et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0086128 A1 | 4/2012 | Ponoth et al. |
| 2012/0091806 A1 | 4/2012 | Tsutsumi et al. |
| 2012/0094194 A1 | 4/2012 | Visco et al. |
| 2012/0104990 A1 | 5/2012 | Boysen et al. |
| 2012/0107675 A1 | 5/2012 | Kim et al. |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161273 A1 | 6/2012 | Jha et al. |
| 2012/0171524 A1 | 7/2012 | Hiraiwa et al. |
| 2012/0183838 A1 | 7/2012 | An et al. |
| 2012/0190252 A1 | 7/2012 | Pavlinsky et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | McBride et al. |
| 2012/0319653 A1 | 12/2012 | Kumar et al. |
| 2012/0328910 A1 | 12/2012 | La et al. |
| 2012/0328930 A1 | 12/2012 | Inagaki et al. |
| 2012/0328935 A1 | 12/2012 | Matsui et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams et al. |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |

(56) References Cited

U.S. PATENT DOCUMENTS

| | | |
|---|---|---|
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0073234 A1 | 3/2013 | Leport et al. |
| 2013/0074485 A1 | 3/2013 | McBride et al. |
| 2013/0074488 A1 | 3/2013 | McBride et al. |
| 2013/0074940 A1 | 3/2013 | Mcbride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |
| 2013/0130085 A1 | 5/2013 | Choi |
| 2013/0134928 A1 | 5/2013 | Uchihashi et al. |
| 2013/0136980 A1 | 5/2013 | Bartling |
| 2013/0143139 A1 | 6/2013 | Tao et al. |
| 2013/0145764 A1 | 6/2013 | McBride et al. |
| 2013/0149567 A1 | 6/2013 | Schaefer |
| 2013/0166085 A1 | 6/2013 | Cherian et al. |
| 2013/0183544 A1 | 7/2013 | Yoshioka et al. |
| 2013/0248437 A1* | 9/2013 | Frazier .................. H01M 50/24 210/484 |
| 2013/0295435 A1 | 11/2013 | Vu |
| 2013/0315659 A1 | 11/2013 | Kumar et al. |
| 2014/0000251 A1 | 1/2014 | McBride et al. |
| 2014/0038011 A1 | 2/2014 | Fukunaga et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0176147 A1 | 6/2014 | Wiegman et al. |
| 2014/0220428 A1 | 8/2014 | Zinck et al. |
| 2014/0242466 A1 | 8/2014 | Murashi et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0277791 A1 | 9/2014 | Lenard et al. |
| 2014/0315097 A1 | 10/2014 | Tan et al. |
| 2014/0349159 A1 | 11/2014 | Bartling et al. |
| 2014/0365027 A1 | 12/2014 | Namba et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0093614 A1 | 4/2015 | Fukuhara et al. |
| 2015/0132627 A1 | 5/2015 | Bradwell et al. |
| 2015/0132628 A1 | 5/2015 | Bradwell et al. |
| 2015/0214579 A1 | 7/2015 | Boysen et al. |
| 2015/0249273 A1 | 9/2015 | Bradwell et al. |
| 2015/0249274 A1 | 9/2015 | Bradwell et al. |
| 2015/0280480 A1 | 10/2015 | Mitri et al. |
| 2015/0303525 A1 | 10/2015 | Bradwell et al. |
| 2015/0318586 A1 | 11/2015 | Rahmane et al. |
| 2015/0325821 A1 | 11/2015 | Bradwell et al. |
| 2015/0380713 A1 | 12/2015 | Kimura et al. |
| 2016/0006090 A1 | 1/2016 | Licht |
| 2016/0156068 A1 | 6/2016 | Burke et al. |
| 2016/0172714 A1 | 6/2016 | Ouchi et al. |
| 2016/0186235 A1 | 6/2016 | Joseph et al. |
| 2016/0190607 A1 | 6/2016 | Wyser et al. |
| 2016/0211555 A9 | 7/2016 | Bradwell et al. |
| 2016/0254512 A1 | 9/2016 | Yin et al. |
| 2016/0301038 A1 | 10/2016 | Modest et al. |
| 2016/0336623 A1 | 11/2016 | Nayar et al. |
| 2016/0344066 A1 | 11/2016 | Sudworth et al. |
| 2016/0365612 A1* | 12/2016 | Bradwell ............ H01M 10/615 |
| 2016/0372763 A1 | 12/2016 | Lu et al. |
| 2017/0018811 A1 | 1/2017 | Bradwell et al. |
| 2017/0104244 A1 | 4/2017 | Bull et al. |
| 2017/0149095 A1 | 5/2017 | Amendola et al. |
| 2017/0222273 A1 | 8/2017 | Bradwell et al. |
| 2017/0248041 A1 | 8/2017 | Lenk et al. |
| 2017/0259648 A1 | 9/2017 | Putcha et al. |
| 2017/0263951 A1 | 9/2017 | Kanno et al. |
| 2017/0309979 A1* | 10/2017 | Lee .................. H01M 10/6566 |
| 2017/0338451 A9 | 11/2017 | Bradwell et al. |
| 2017/0358941 A1 | 12/2017 | Mitri et al. |
| 2018/0034110 A1 | 2/2018 | Sudworth et al. |
| 2018/0083274 A1 | 3/2018 | Martin |
| 2018/0090726 A1 | 3/2018 | Thompson et al. |
| 2018/0097259 A1 | 4/2018 | Bradwell et al. |
| 2018/0159179 A1 | 6/2018 | Bradwell et al. |
| 2018/0191162 A1 | 7/2018 | Hanada et al. |
| 2018/0315976 A1 | 11/2018 | Lee et al. |
| 2019/0089013 A1 | 3/2019 | Ouchi et al. |
| 2019/0115632 A1 | 4/2019 | Beuning et al. |
| 2019/0123369 A1 | 4/2019 | Ma et al. |
| 2019/0296276 A1 | 9/2019 | Bradwell et al. |
| 2020/0076006 A1 | 3/2020 | Bradwell et al. |
| 2020/0176824 A1 | 6/2020 | Bradwell et al. |
| 2020/0280040 A1 | 9/2020 | Lee et al. |
| 2020/0287247 A1 | 9/2020 | Bradwell et al. |
| 2021/0036273 A1 | 2/2021 | Thompson et al. |
| 2021/0043982 A1 | 2/2021 | Bradwell et al. |
| 2022/0077508 A1 | 3/2022 | Nayar et al. |
| 2022/0255138 A1 | 8/2022 | Bradwell et al. |
| 2022/0359917 A1 | 11/2022 | Bradwell et al. |
| 2023/0282891 A1 | 9/2023 | Bradwell et al. |
| 2023/0282892 A1 | 9/2023 | Bradwell et al. |
| 2023/0344015 A1 | 10/2023 | Bradwell et al. |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 1578553 A | 2/2005 |
| CN | 1743056 A | 3/2006 |
| CN | 1750309 A | 3/2006 |
| CN | 101436780 A | 5/2009 |
| CN | 101506117 A | 8/2009 |
| CN | 101519313 A | 9/2009 |
| CN | 101640256 A | 2/2010 |
| CN | 201518329 U | 6/2010 |
| CN | 101828285 A | 9/2010 |
| CN | 101942676 A | 1/2011 |
| CN | 102024922 A | 4/2011 |
| CN | 201809448 U | 4/2011 |
| CN | 201908137 U | 7/2011 |
| CN | 102181883 A | 9/2011 |
| CN | 202076339 U | 12/2011 |
| CN | 102498589 A | 6/2012 |
| CN | 202268405 U | 6/2012 |
| CN | 102646808 A | 8/2012 |
| CN | 103001239 A | 3/2013 |
| CN | 202797170 U | 3/2013 |
| CN | 103137916 A | 6/2013 |
| CN | 103342556 A | 10/2013 |
| CN | 103367663 A | 10/2013 |
| CN | 103943794 A | 7/2014 |
| CN | 203707210 U | 7/2014 |
| CN | 104364930 A | 2/2015 |
| CN | 105190984 A | 12/2015 |
| CN | 105659415 A | 6/2016 |
| CN | 105830247 A | 8/2016 |
| CN | 206210892 U | 5/2017 |
| CN | 107204410 A | 9/2017 |
| CN | 206774598 U | 12/2017 |
| DE | 3239964 A1 | 5/1984 |
| DE | 19618609 A1 | 11/1997 |
| DE | 102012103386 A1 | 10/2013 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2665120 A1 | 11/2013 |

(56) References Cited

FOREIGN PATENT DOCUMENTS

| | | |
|---|---|---|
| EP | 2709188 A1 | 3/2014 |
| EP | 2909887 A1 | 8/2015 |
| EP | 3607603 | 2/2020 |
| EP | 3898421 A1 | 10/2021 |
| GB | 2062939 A | 5/1981 |
| JP | S4933815 B1 | 9/1974 |
| JP | S5268929 A | 6/1977 |
| JP | S55053877 A1 | 4/1980 |
| JP | S61114664 A | 6/1986 |
| JP | H06223872 A | 8/1994 |
| JP | H06310171 A | 11/1994 |
| JP | H09167631 A | 6/1997 |
| JP | H1012270 A | 1/1998 |
| JP | H10208771 A | 8/1998 |
| JP | H117923 A | 1/1999 |
| JP | H11185800 A | 7/1999 |
| JP | 2001115369 A | 4/2001 |
| JP | 2001243994 A | 9/2001 |
| JP | 2001345098 A | 12/2001 |
| JP | 3355377 B2 | 12/2002 |
| JP | 2003068356 A | 3/2003 |
| JP | 2003146771 A | 5/2003 |
| JP | 2003187860 A | 7/2003 |
| JP | 2007157373 A | 6/2007 |
| JP | 2010206101 A | 9/2010 |
| JP | 2010214396 A | 9/2010 |
| JP | 2010535942 A | 11/2010 |
| JP | 2011508379 A | 3/2011 |
| JP | 2012119220 A | 6/2012 |
| JP | 2012124009 A | 6/2012 |
| JP | 2012226866 A | 11/2012 |
| JP | 2012533865 A | 12/2012 |
| JP | 2013055193 A | 3/2013 |
| JP | 2013537361 A | 9/2013 |
| JP | 2014154337 A | 8/2014 |
| JP | 2014526114 A | 10/2014 |
| JP | 2016510936 A | 4/2016 |
| JP | 2016522557 A | 7/2016 |
| JP | 2016535392 A | 11/2016 |
| JP | 2016539461 A | 12/2016 |
| JP | 2017073270 A | 4/2017 |
| KR | 20120059106 A | 6/2012 |
| KR | 20200056715 A | 5/2020 |
| RU | 2031491 C1 | 3/1995 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |
| WO | WO-2008105807 A2 | 9/2008 |
| WO | WO-2008105811 A2 | 9/2008 |
| WO | WO-2008045996 A3 | 10/2008 |
| WO | WO-2008105811 A3 | 12/2008 |
| WO | WO-2009046533 A1 | 4/2009 |
| WO | WO-2009151639 A1 | 12/2009 |
| WO | WO-2010130583 A2 | 11/2010 |
| WO | WO-2011011056 A2 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |
| WO | WO-2012040176 A1 | 3/2012 |
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012144344 A1 | 10/2012 |
| WO | WO-2012145314 A2 | 10/2012 |
| WO | WO-2012158751 A1 | 11/2012 |
| WO | WO-2012158781 A2 | 11/2012 |
| WO | WO-2013025608 A1 | 2/2013 |
| WO | WO-2013032667 A1 | 3/2013 |
| WO | WO-2013048704 A1 | 4/2013 |
| WO | WO-2013052494 A1 | 4/2013 |
| WO | WO-2014055873 A1 | 4/2014 |
| WO | WO-2014062702 A1 | 4/2014 |
| WO | WO-2014062706 A1 | 4/2014 |
| WO | WO-2014140792 A2 | 9/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015063588 A2 | 5/2015 |
| WO | WO-2015066359 A1 | 5/2015 |
| WO | WO-2016050329 A1 | 4/2016 |
| WO | WO-2016138499 A1 | 9/2016 |
| WO | WO-2016141354 A2 | 9/2016 |
| WO | WO-2018/052797 | 3/2018 |
| WO | WO-2018/187777 | 11/2018 |
| WO | WO-2020131617 A1 | 6/2020 |
| WO | WO-2021050987 A1 | 3/2021 |
| WO | WO-2021098761 A1 | 5/2021 |

OTHER PUBLICATIONS

Advisory Action Before Filing of Appeal Brief dated Jun. 8, 2012 for U.S. Appl. No. 12/839,130.

Agruss. The Thermally Regenarative Liquid-Metal Cell, J. Electrochem. Soc. Nov. 1963; 110(11):1097-1103.

Allanore, A. Features and Challenges of Molten Oxide Electrolytes for Metal Extraction. Journal of The Electrochemical Society, 162 (1): E13-E22 (2015). Published Nov. 25, 2014.

Allanore, et al. A new anode material for oxygen evolution in molten oxide electrolysis. Nature, vol. 497, May 16, 2013, pp. 353-356 and Online Methods Section. Published online May 8, 2013.

ATI Technical Data Sheet, ATI 18CrCb Stainless Steel, Feb. 17, 2014.

Atthey. A Mathematical Model for Fluid Flow in a Weld Pool at High Currents. J. Fluid Mech. 1980; 98(4):787-801.

Biswas, et al. Towards Implementation of Smart Grid: An Updated Review on Electrical Energy Storage Systems. Smart Grid and Renewable Energy. 2013; 4:122-132. Published online Feb. 2013.

Bradwell, et al. Magnesium-antimony liquid metal battery for stationary energy storage. J Am Chem Soc. Feb. 1, 2012;134(4):1895-7. doi: 10.1021/ja209759s. Published on web Jan. 6, 2012.

Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.

Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.

Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.

Bradwell. Liquid metal batteries: ambipolar electrolysis and alkaline earth electroalloying cells. Thesis. Massachusetts Institute of Technology. Dept. of Materials Science and Engineering. 2011.

Bradwell. Technical and economic feasibility of a high-temperature self-assembling battery. Thesis. Department of Material Science and Engineering. MIT. 2006.

Cairns, et al. Galvanic Cells with Fused-Salt Electrolytes. AEC Research and Development. 220 pages, Nov. 1967.

(56) References Cited

OTHER PUBLICATIONS

Cairns, et al. High Temperature Batteries Research in high-temperature electrochemistry reveals compact, powerful energy-storage cells. Science. Jun. 20, 1969; 164(3886):1347-1355.
Cerablak™ technology. Atfi Surface Science Solutions. http://www.atfinet.com/index.php/technology. Accessed Feb. 24, 2016.
Chuang. Floating capacitor active charge balancing for PHEV application. Thesis. Ohio State University. 2010.
Co-pending U.S. Appl. No. 13/999,704, inventors David; S. Deak et al., filed Mar. 14, 2014.
Co-pending U.S. Appl. No. 16/740,178, inventors Nayarhari et al., filed Jan. 10, 2020.
Co-pending U.S. Appl. No. 17/136,432, inventors Nayarhari et al., filed Dec. 29, 2020.
Co-pending U.S. Appl. No. 17/399,724, inventors Nayarhari et al., filed Aug. 11, 2021.
Co-pending U.S. Appl. No. 17/404,341, inventors Bradwelldavid; J. et al., filed Aug. 17, 2021.
Crowley, B. New battery could be solar power's BFF video. http://money.cnn.com/video/technology/2012/08/16/bsg-liquid-metal-battery-energy.cnnmoney. CNN Money, 2012. Accessed Jun. 29, 2015.
Cubicciotti, et al. Metal-Salt Interactions at High Temperatures: The Solubilities of Some alkaline Earth Metals in their Halides. J. Am. Chem. Soc. 1949; 71(6):2149-2153.
Davis, J.R., Effect of temperature on properties. ASM specialty handbook—Copper and copper alloys. ASM international. 2001: pp. 430-439.
Donald Sadoway: The Colbert Report video. http://thecolbertreport.cc.com/videos/8uddyg/donald-sadoway. The Colbert Report, Oct. 22, 2012. Accessed Jun. 29, 2015.
Donald Sadoway: The missing link to renewable energy Youtube Video. https://www.youtube.com/watch?v=Sddb0Khx0yA. TED, Mar. 2012. Accessed Jun. 29, 2015.
Dworkin, et al. The Electrical Conductivity of Solutions of Metals in their Molten Halides. VIII. alkaline Earth Metal Systems. J. Phys. Chem. Jul. 1966; 70(7):2384.
Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.
Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.
Energy 2064 with Professor Donald R. Sadoway Youtube Video. https://www.youtube.com/watch?v=0iwG32R2R5o. Alger, Oct. 7, 2014. Accessed Jun. 29, 2015.
EP17851347.9 Extended European Search Report Dated Mar. 16, 2020.
EP18194103.0 Extended European Search Report dated Mar. 19, 2019.
EP18781400.9 Extended European Search Report dated Dec. 11, 2020.
"European Extended Search Report and opinion dated May 29, 2017 for EP Application No. 14857245.".
European search report and search opinion dated Feb. 12, 2014 for EP Application No. 13196841.4.
European search report and search opinion dated May 6, 2016 for EP Application No. 13847926.
European search report and search opinion dated May 13, 2016 for EP Application No. 13846301.
European supplemental search report and opinion dated Mar. 16, 2017 for EP Application No. 14853610.
Fujiwara, et al. New molten salt systems for high temperature molten salt batteries: Ternary and quaternary molten salt systems based on LiF—LiCl, LiF—LiBr, and LiCl—LiBr. Journal of Power Sources. Apr. 15, 2011; 196(8):4012-4018.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.
GE Energy Storage Durathon Battery Durathon E620 Battery Module Technical Specifications. Available at http://www.geenergystorage.com/images/ge/PDF/DurathonGridE620ModuleSpecSheet.pdf. 2012, Accessed on Oct. 18, 2012.
GE Energy Storage Durathon DC System Technical Specifications—MWh Series, 2014. Accessed Apr. 7, 2015. https://renewables.gepower.com/content/dam/gepower-renewables/global/en_US/documents/Durathon_DCMWh_Spec_Sheet_GEA-988123002A.pdf.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website. https://en.wikipedia.org/wiki/Intermetallic. Accessed Jul. 2, 2015.
International preliminary report on patentability and written opinion dated Jan. 24, 2012 for PCT Application No. US2010/002035.
International preliminary report on patentability and written opinion dated Feb. 17, 2009 for PCT Application No. US2007/018168.
International preliminary report on patentability and written opinion dated Mar. 26, 2013 for PCT Application No. US2011/052316.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
International preliminary report on patentability dated Mar. 31, 2016 for PCT Application No. PCT/US2014/056367.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
International search report and written opinion dated Jan. 22, 2015 for PCT Application No. US2014/061266.
International search report and written opinion dated Jan. 23, 2015 for PCT Application No. PCT/US2014/056367.
International search report and written opinion dated Jan. 24, 2014 for PCT/US2013/065086.
International search report and written opinion dated Jan. 27, 2014 for PCT Application No. US2013/063472.
International search report and written opinion dated Jan. 29, 2015 for PCT Application No. US2014/060979.
International search report and written opinion dated Feb. 7, 2011 for PCT/US2010/002035.
International search report and written opinion dated Jun. 1, 2016 for PCT/US2016/019970.
International search report and written opinion dated Jun. 11, 2015 for PCT Application No. IB2014/002608.
International search report and written opinion dated Sep. 7, 2016 for PCT/US2016/021048.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Jarret, et al. Advances in the Smelting of aluminum. Metallurgical Treatises, pp. 137-157, 1981.

(56) References Cited

OTHER PUBLICATIONS

Javadekar, et al. Energy Storage in Electrochemical Cells with Molten Sb Electrodes. Journal of The Electrochemical Society, 159 (4) A386-A389 (2012); Jan. 24, 2012 http://repository.upenn.edu/cgi/viewcontent.cgi?article=1170&context=cbe_papers.
Jungblut, et al. Diffusion of lithium in highly oriented pyrolytic graphite at low concentrations and high temperatures. Phys Rev B Condens Matter. Dec. 1, 1989;40(16):10810-10815.
Kane, et al. Electrochemical Determination of the Thermodynamic Properties of Lithium-Antimony Alloys. Journal of the Electrochemical Society, 162 (3) A421-A425 (2015). Published Dec. 31, 2014.
Kaufman, J.G., Application of aluminum alloys and tempers. Introduction to aluminum alloys and tempers—Preface. ASM International. 2000; pp. 87-118.
Kaufman, J.G., Properties and Characteristics of Aluminum and Aluminum Alloys. Fire Resistance of Aluminum and Aluminum Alloys and Measuring the Effects of Fire Exposure on the Properties of Aluminum Alloys. 2016. 9 Pages.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.
Kim, et al. Electrolysis of Molten Iron Oxide with an Iridium Anode: The Role of Electrolyte Basicity. Journal of The Electrochemical Society, 158 (10) E101-E105 (2011). Published Aug. 5, 2011.
Kim, et al. Liquid Metal Batteries: Past, Present, and Future. Chemical Reviews, vol. 113, No. 3, Mar. 13, 2013, pp. 2075-2099. Published on web Nov. 27, 2012.
Kipouros, et al. Toward new technologies for the production of Lithium. JOM, May 1998, pp. 24-26.
Lalau, et al. Sodium-bismuth-lead low temperature liquid metal battery. Journal for Electrochemistry and Plating Technology, Jun. 2015, pp. 1-7.
Lee, et al., Oxidation Behavior of Copper at a Temperature below 300° C. and the Methodology for Passivation. Materials Research. 2016; 19(1): 51-56.
Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami.6b02576. Epub May 5, 2016.With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Liquid Metal Battery Research Company website. http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.
Magnuski, H. Innovations in Energy Storage—Professor Sadoway Video. https://vimeo.com/20906061. MIT Club of Northern California, Mar. 8, 2011. Accessed Jun. 29, 2015.
McAlister, A. J. The Al—Li (Aluminum-Lithium) System. Bulletin of Alloy Phase Diagrams, vol. 3, No. 2, 1982, pp. 177-178. doi: 10.1007/BF02892377.
Merriam-Webster's Medical Dictionary Website. http://merriam-webster.com/medical/room%20temperature. Apr. 2009.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.

Ning, et al. Self-healing Li—Bi liquid metal battery for grid-scale energy storage. Journal of Power Sourches 275 (2015) 370-376. Available online Oct. 29, 2014.
Norbert Weber et al., Sloshing instability and electrolyte layer rupture in liquid metal batteries. arxiv.org, Cornell university library, 201 Olin library cornell university ithaca, NY 14853, Dec. 12, 2016, XP081362128.
Notice of allowance dated Jan. 6, 2015 for U.S. Appl. No. 13/237,215.
Notice of allowance dated Jan. 11, 2018 for U.S. Appl. No. 15/136,337.
Notice of allowance dated Mar. 8, 2016 for U.S. Appl. No. 13/801,333.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 11, 2017 for U.S. Appl. No. 14/688,214.
Notice of allowance dated Apr. 13, 2017 for U.S. Appl. No. 14/688,179.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
"Notice of allowance dated May 11, 2017 for U.S. Appl. No. 14/688,214".
Notice of allowance dated Jul. 5, 2016 for U.S. Appl. No. 14/178,806.
Notice of allowance dated Jul. 13, 2012 for U.S. Appl. No. 11/839,413.
"Notice of allowance dated Jul. 17, 2017 for U.S. Appl. No. 14/688,214".
Notice of allowance dated Jul. 25, 2016 for U.S. Appl. No. 14/286,369.
"Notice of allowance dated Jul. 28, 2017 for U.S. Appl. No. 14/688,214".
Notice of allowance dated Jul. 31, 2015 for U.S. Appl. No. 13/801,333.
Notice of allowance dated Aug. 2, 2012 for U.S. Appl. No. 12/505,937.
Notice of allowance dated Aug. 22, 2016 for U.S. Appl. No. 14/536,549.
"Notice of allowance dated Sep. 11, 2017 for U.S. Appl. No. 15/289,857".
Notice of allowance dated Sep. 18, 2015 for U.S. Appl. No. 13/801,333.
"Notice of allowance dated Sep. 28, 2017 for U.S. Appl. No. 14/688,214".
Notice of allowance dated Oct. 4, 2017 for U.S. Appl. No. 15/136,337.
Notice of allowance dated Oct. 7, 2016 for U.S. Appl. No. 14/178,806.
Notice of allowance dated Oct. 19, 2017 for U.S. Appl. No. 14/688,214.
Notice of allowance dated Nov. 17, 2017 for U.S. Appl. No. 15/136,337.
Notice of allowance dated Dec. 11, 2015 for U.S. Appl. No. 13/801,333.
Notice of allowance dated Dec. 20, 2017 for U.S. Appl. No. 15/136,337.
Notice of allowance dated Mar. 22, 2017 for U.S. Appl. No. 14/536,563.
"Notice of allowance dated Aug. 31, 2018 for U.S. Appl. No. 15/057,732".
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS A Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.

(56) References Cited

OTHER PUBLICATIONS

Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
"Office action dated Feb. 5, 2016 for U.S. Appl. No. 14/536,549.".
Office action dated Mar. 14, 2014 for U.S. Appl. No. 13/237,215.
Office action dated Mar. 16, 2012 for U.S. Appl. No. 12/839,130.
"Office action dated Mar. 27, 2018 for U.S. Appl. No. 15/140,434.".
"Office action dated Apr. 18, 2018 for U.S. Appl. No. 14/975,587.".
"Office action dated Apr. 20, 2018 for U.S. Appl. No. 15/057,732.".
"Office action dated May 1, 2017 for U.S. Appl. No. 14/678,602.".
Office action dated May 13, 2011 for U.S. Appl. No. 11/839,413.
Office action dated Jun. 7, 2016 for U.S. Appl. No. 14/045,967.
"Office action dated Jun. 7, 2018 for U.S. Appl. No. 14/687,838.".
"Office action dated Jun. 15, 2017 for U.S. Appl. No. 14/687,838".
"Office action dated Jun. 25, 2018 for U.S. Appl. No. 15/063,842.".
Office action dated Jun. 30, 2016 for U.S. Appl. No. 14/536,563.
Office action dated Jul. 31, 2015 for U.S. Appl. No. 14/210,051.
Office action dated Aug. 21, 2014 for U.S. Appl. No. 12/839,130.
"Office action dated Aug. 30, 2017 for U.S. Appl. No. 14/975,587".
Office action dated Sep. 3, 2014 for U.S. Appl. No. 13/801,333.
"Office action dated Sep. 5, 2017 for U.S. Appl. No. 15/140,434".
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 13, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Office action dated Nov. 24, 2015 for U.S. Appl. No. 14/045,967.
Office action dated Dec. 1, 2014 for U.S. Appl. No. 14/210,051.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of The Electrochemical Society. 2014; 161(12):A1898-A1904. Published Sep. 9, 2014.
Ouchi, et al. Calcium-based multi-element chemistry for grid-scale electrochemical energy storage. Nat Commun. Mar. 22, 2016;7:10999. doi: 10.1038/ncomms10999.With supplementary materials.
"Spatocco, et al. Low-Temperature Molten Salt Electrolytes for Membrane-Free Sodium Metal Batteries. Published Oct. 20, 2015, available at http://jes.ecsdl.org/content/162/14/A2729.full.pdf+html".
PCT/US2017/050544 International Search Report dated Apr. 24, 2018.
PCT/US2018/026601 International Search Report dated Jul. 30, 2018.
PCT/US2019/066231 International Search Report and Written Opinion dated Mar. 2, 2020.
Pflanz, K. A Liquid Layer Solution for the Grid. http://energy.gov/articles/liquid-layer-solution-grid. Sep. 15, 2011. Accessed Jul. 2, 2015.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Qingsong; Wang et al, "Thermal Runaway Caused Fire and Explosion of Lithium Ion Battery", Journal of Power Sources, 2012, 208, 210-224.
Response After Final Rejection dated Apr. 27, 2012 for U.S. Appl. No. 12/839,130.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Shimotake, et al. Bimetallic Galvanic Cells With Fused-Salt Electrolytes. Advances in Energy Conversion Engineering. pp. 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. pp. 1-43. Adv. In Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
U.S. Appl. No. 15/647,468 Notice of Allowance dated Oct. 2, 2019.
U.S. Appl. No. 14/687,838 Notice of Allowance dated Nov. 26, 2019.
U.S. Appl. No. 14/975,587 Notice of Allowance dated Jan. 9, 2019.
U.S. Appl. No. 14/975,587 Notice of Allowance dated Mar. 15, 2019.
U.S. Appl. No. 14/975,587 Notice of Allowance dated Oct. 9, 2018.
U.S. Appl. No. 15/057,732 Notice of Allowance dated Oct. 10, 2018.
U.S. Appl. No. 15/063,842 Office Action dated Feb. 17, 2021.
U.S. Appl. No. 15/063,842 Office Action dated Feb. 26, 2019.
U.S. Appl. No. 15/063,842 Office Action dated May 27, 2020.
U.S. Appl. No. 15/063,842 Office Action dated Sep. 20, 2019.
U.S. Appl. No. 15/130,129 Office Action dated Dec. 6, 2018.

(56) References Cited

OTHER PUBLICATIONS

U.S. Appl. No. 15/130,129 Office Action dated Jul. 3, 2019.
U.S. Appl. No. 15/130,129 Office Action dated Jul. 9, 2020.
U.S. Appl. No. 15/130,292 Office Action dated Jan. 24, 2020.
U.S. Appl. No. 15/130,292 Office Action dated Mar. 20, 2019.
U.S. Appl. No. 15/130,292 Office Action dated Nov. 19, 2018.
U.S. Appl. No. 15/140,434 Office Action dated Jun. 12, 2019.
U.S. Appl. No. 15/140,434 Office Action dated Sep. 19, 2018.
U.S. Appl. No. 15/647,468 Notice of Allowance dated Oct. 24, 2019.
U.S. Appl. No. 15/647,468 Office Action dated Jun. 5, 2019.
U.S. Appl. No. 15/690,863 Notice of Allowance dated Jan. 22, 2020.
U.S. Appl. No. 15/690,863 Office Action dated May 17, 2019.
U.S. Appl. No. 15/836,038 Notice of Allowance dated Jan. 9, 2019.
U.S. Appl. No. 16/202,758 Notice of Allowance dated Nov. 8, 2019.
U.S. Appl. No. 16/202,758 Notice of Allowance dated Oct. 7, 2019.
U.S. Appl. No. 16/293,288 Office Action dated Sep. 28, 2021.
U.S. Appl. No. 16/592,621 Office Action dated Jul. 6, 2021.
U.S. Appl. No. 16/718,020 Notice of Allowance dated Jul. 28, 2021.
U.S. Appl. No. 16/858,189 Notice of Allowance dated Aug. 18, 2021.
Vassiliev, et al. A new proposal for the binary (Sn,Sb) phase diagram and its thermodynamic properties based on a new e.m.f study Journal of Alloys and Compounds 247 (1997) 223-233.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.
Weaver, et al. The Sodium1Tin Liquid-Metal Cell. J. Electrochem. Soc., 109 (8), 653-657 (Aug. 1962).
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Yu, et al. Determination of the Lithium Ion Diffusion Coefficient in Graphite. J. Electrochem. Soc. 1999 vol. 146, issue 1, 8-14.
Zhang; et al. Pyrite FeS2 as an efficient adsorbent of lithium polysulfide for improved lithium-sulfur batteries. Journal of Materials Chemistry A, vol. 4, Feb. 23, 2016, pp. 4371-4374. doi: 10.1039/C6TA01214K. With supporting information.
Co-pending U.S. Appl. No. 17/510,056, inventors Bradwelldavid; J. et al., filed Oct. 25, 2021.
Co-pending U.S. Appl. No. 17/529,171, inventors Bradwelldavid; J. et al., filed Nov. 17, 2021.
Co-pending U.S. Appl. No. 17/670,168, inventors Thompsongreg et al., filed Feb. 11, 2022.
RU2031491C1 English translation. Nikolaev et al., Russia. Mar. 20, 1995.
U.S. Appl. No. 16/592,621 Notice of Allowance dated Feb. 23, 2022.
U.S. Appl. No. 16/593,278 Notice of Allowance dated Mar. 24, 2022.
U.S. Appl. No. 16/829,965 Notice of Allowance Nov. 19, 2021.
Co-pending U.S. Appl. No. 15/628,538, inventor Bradwell; David J., filed Jun. 20, 2017.
Co-pending U.S. Appl. No. 18/141,041, inventors Bradwelldavid; J. et al., filed Apr. 28, 2023.
Co-pending U.S. Appl. No. 18/203,822, inventors Bradwell; David J. et al., filed May 31, 2023.
Co-pending U.S. Appl. No. 18/381,512, inventors Thompson; Greg et al., filed Oct. 18, 2023.
Co-pending U.S. Appl. No. 18/410,790, inventors Bradwell; David J. et al., filed Jan. 11, 2024.
Co-pending U.S. Appl. No. 18/417,936, inventors Bradwell; David J. et al., filed Jan. 19, 2024.
Co-pending U.S. Appl. No. 18/436,940, inventors Bradwell; David J. et al., filed Feb. 8, 2024.
Co-pending U.S. Appl. No. 18/680,139, inventors Thompson; Greg et al., filed May 31, 2024.
English machine translation of Claus (DE 102012103386 A1) (Year: 2013).
English machine translation of Koji et al. (JP 2012226866 A) (Year: 2012).
English machine translation of Tinguely et al. (EP 2665120 A1) (Year: 2013).
Huang, Ling, et al., Electrodeposition and lithium storage performance of novel three-dimensional porous Fe—Sb—P amorphous alloy electrode. Electrochemistry Communications vol. 11, No. 3, 585-588 (2009).
JPH1012270 English translation. Udou et al. Japan. Jan. 16, 1998.
PCT/US2020/050547 International Search Report and Written Opinon dated Dec. 24, 2020.
PCT/US2023/011761 International Search Report and Written Opinion dated May 18, 2023.
Poizeau, Sophie, Thermodynamic properties and atomic structure of Ca-based liquid alloys, PhD Thesis, Massachusetts Institute of Technology, pp. 1-164, Feb. 2013.
U.S. Appl. No. 17/670,168 Notice of Allowance dated Oct. 25, 2023.
U.S. Appl. No. 18/218,412 Office Action dated Jan. 18, 2024.
U.S. Appl. No. 16/293,288 Office Action dated Feb. 13, 2023.
U.S. Appl. No. 16/293,288 Office Action dated May 13, 2022.
U.S. Appl. No. 16/293,288 Office Action dated Sep. 12, 2022.
U.S. Appl. No. 16/593,278 Notice of Allowance dated Apr. 7, 2022.
U.S. Appl. No. 17/404,341 Office Action dated Mar. 10, 2023.
U.S. Appl. No. 17/510,056 Notice of Allowance dated Jun. 22, 2023.
U.S. Appl. No. 17/510,056 Notice of Allowance dated Mar. 3, 2023.
U.S. Appl. No. 17/510,056 Office Action dated Sep. 23, 2022.
U.S. Appl. No. 17/529,171 Notice of Allowance dated Nov. 10, 2022.
U.S. Appl. No. 17/670,168 Notice of Allowance dated Jul. 19, 2023.
U.S. Appl. No. 17/670,168 Office Action dated Mar. 7, 2023.
U.S. Appl. No. 17/747,333 Notice of Allowance dated Feb. 1, 2023.
U.S. Appl. No. 18/141,041 Notice of Allowance dated Jun. 21, 2024.
U.S. Appl. No. 18/141,041 Notice of Allowance dated Mar. 1, 2024.
U.S. Appl. No. 18/141,041 Notice of Allowance dated Mar. 28, 2024.
U.S. Appl. No. 18/166,814 Notice of Allowance dated Oct. 12, 2023.
U.S. Appl. No. 18/196,225 Notice of Allowance dated Aug. 24, 2023.
U.S. Appl. No. 18/218,412 Office Action dated Aug. 24, 2023.

* cited by examiner

HIGH TEMPERATURE ENERGY STORAGE SYSTEMS AND METHODS

CROSS-REFERENCE

This application is a continuation of International Application No. PCT/US2019/066231, filed Dec. 13, 2019, which claims priority to U.S. Provisional Patent Application No. 62/780,857, filed on Dec. 17, 2018, which are entirely incorporated herein by reference.

BACKGROUND

An energy storage device (or battery) is a device that may be capable of converting stored chemical energy into electrical energy. The energy storage device may be used in various household and industrial applications. The energy storage device may be used to perform work. Chemical energy stored in the energy storage device may be released when the energy storage device is attached to an electrical load (e.g., power grid or an electrical appliance).

There are energy storage devices that may be operated at elevated temperatures, such temperatures in excess of 100° C. Such devices may be liquid metal batteries, which may include one or more components that are liquid at an operating temperature.

SUMMARY

As recognized herein, there remain challenges in storing energy storage devices in a low-cost and efficient manner. Systems to store multiple liquid metal batteries may be expensive to manufacture. Moreover, thermal insulation materials are available either as panels or in rolls, and may not form effective thermal barriers around joints, seams and/or gaps in the system. In such a situation, the system may have thermal leak paths that reduce the overall thermal efficiency of the system.

Recognized herein is a need for low-cost and/or sufficiently low-weight systems for storing high temperature devices (e.g., liquid metal batteries). There is also a need for a system with safe and efficient insulation for the high temperature devices.

In an aspect, the present disclosure provides an energy storage system, comprising: a plurality of electrochemical cells, wherein an electrochemical cell of the plurality of electrochemical cells comprises a negative electrode, electrolyte and positive electrode, wherein at least two of the negative electrode, the electrolyte and the positive electrode is in a liquid state at an operating temperature of the electrochemical cell, and wherein the plurality of electrochemical cells are connected in series or parallel; and a rack supporting the plurality of electrochemical cells, wherein the rack comprises a plurality of trays, and wherein a tray of the plurality of trays comprises support units that are not coupled to one another via fasteners.

In some embodiments, the energy storage device further comprises an enclosure and wherein the rack is disposed inside the enclosure. In some embodiments, the enclosure comprises a plurality of racks, which plurality of racks comprises the rack. In some embodiments, the enclosure further comprises an enclosure external cover, and wherein the enclosure external cover is electrically isolated from the rack. In some embodiments, the rack is placed on one or more insulation boards in the enclosure. In some embodiments, the energy storage device further comprises insulation material disposed between the rack and the enclosure. In some embodiments, the insulation material is in powder form. In some embodiments, the rack further comprises a rack external cover, and wherein the rack external cover is electrically connected to the rack. In some embodiments, the rack external cover or the enclosure external cover comprises a removable front cover.

In some embodiments, one or more of the plurality of electrochemical cells are disposed on the tray. In some embodiments, at least a portion of the support units are a plurality of cross-sectional support members configured to support the plurality of electrochemical cells. In some embodiments, an aspect ratio of the tray is less than or equal to about 0.5. In some embodiments, the rack comprises one or more heaters configure to supply thermal energy to the plurality of electrochemical cells. In some embodiments, the one or more heaters are disposed on an inside of the rack or adjacent to a pass-through of the rack. In some embodiments, the one or more heaters comprise an insulator and a heating wire, and wherein the heating wire is disposed in a groove of the insulator.

In some embodiments, the system comprises one or more safety features selected from the group consisting of external ports configured to permit the flow of a fluid, venting ports configured to permit release of flow of gases from the rack, and failure tolerant safety indicators. In some embodiments, the rack or the tray is configured to flow a cooling fluid through one or more elements of the rack or the tray. In some embodiments, the plurality of electrochemical cells are connected via interconnects configured to maintain an electrical resistance of less than or equal to about $5 \times 10^{-5}$ Ohm at the operating temperature. In some embodiments, the plurality of electrochemical cells are connected in series and parallel.

In another aspect, the present disclosure provides an energy storage system, comprising: an enclosure; a plurality of electrochemical cells, wherein an electrochemical cell of the plurality of electrochemical cells comprises a negative electrode, electrolyte and positive electrode, wherein at least two of the negative electrode, the electrolyte and the positive electrode is in a liquid state at an operating temperature of the electrochemical cell, wherein the plurality of electrochemical cells are connected in series or parallel; a rack supporting the plurality of electrochemical cells, wherein the rack is disposed in the enclosure; one or more panels between the rack and the enclosure, wherein the one or more panels are configured to form one or more insulation sections; and insulation material disposed in the one or more insulation sections.

In some embodiments, the insulation material is in powder form. In some embodiments, the one or more panels are attached to the rack or the enclosure. In some embodiments, the rack comprises a plurality of racks, which plurality of racks comprises the rack. In some embodiments, the rack is sealed by one or more tube gaskets. In some embodiments, the one or more tube gaskets comprise a woven insulation fabric filled with the insulation material.

In some embodiments, the system comprises one or more safety features selected from the group consisting of external ports configured to permit the flow of a fluid, venting ports configured to permit release of flow of gases from the enclosure, and failure tolerant safety indicators. In some embodiments, the system further comprises a thermal ballast disposed in or adjacent to the rack, wherein the thermal ballast is configured to maintain or regulate a temperature of the enclosure. In some embodiments, the system further comprise a thermally insulated electronics compartment configured to house one or more members selected from the group consisting of a control system, battery management system, heater controller, circuit panels, fuses, alternating current (AC) distribution, AC and direct current (DC) disconnects, communication devices, and safety components.

In some embodiments, the rack is configured to flow a cooling fluid through one or more elements of the rack. In some embodiments, the plurality of electrochemical cells are connected via interconnects configured to maintain an electrical resistance of less than or equal to about $5 \times 10^{-5}$ Ohm at the operating temperature.

In some embodiments, the interconnects comprise one or more materials selected from the group consisting of a nickel alloy, a copper nickel-aluminum bronze alloy, an aluminum brass alloy, a copper alloy, and an aluminum alloy.

In some embodiments, the energy storage system further comprises a ventilation system configured to ventilate the enclosure upon the enclosure reaching a threshold temperature. In some embodiments, the ventilation system comprises a filter configured to remove hydrogen chloride or chlorine gas.

In another aspect, the present disclosure provides a method for manufacturing an energy storage system. The method can comprise (a) providing a plurality of electrochemical cells on a rack, wherein an electrochemical cell of the plurality of electrochemical cells comprises a negative electrode, electrolyte and positive electrode, wherein at least two of the negative electrode, the electrolyte and the positive electrode is in a liquid state at an operating temperature of the electrochemical cell, and wherein the rack comprises a plurality of support elements that are joined together without fasteners; and (b) connecting the plurality of electrochemical in series or parallel using interconnect.

In some embodiments, the method further comprises providing a plurality of insulating panels adjacent to the rack.

In some embodiments, the method further comprises, prior to (a), joining the plurality of support elements together to form the rack.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure," "FIG.," "Figures," or "FIGs." herein), of which:

FIG. 5A shows an example of separate tray elements; FIG. 5B shows an example of assembled tray elements;

DETAILED DESCRIPTION

Figure 1:
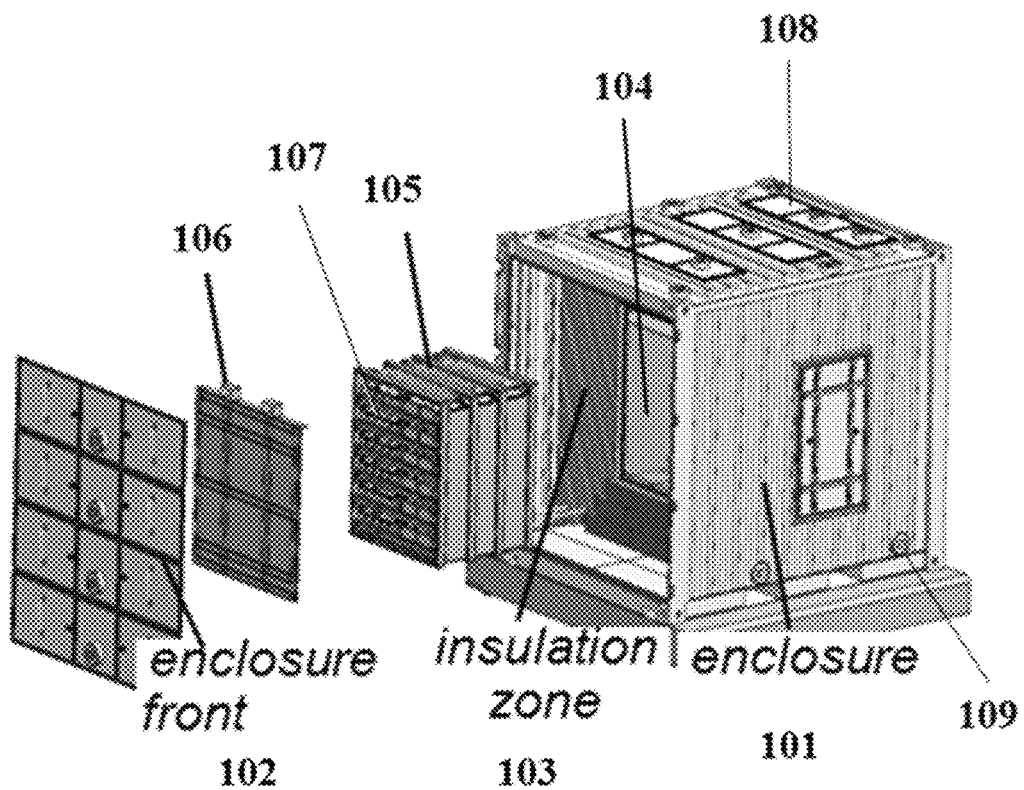
FIG. 1 shows an example of an energy storage system.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "cell," as used herein, generally refers to an electrochemical cell. A cell can include a negative electrode of material 'A' and a positive electrode of material 'B', denoted as A∥B. The positive and negative electrodes can be separated by an electrolyte. A cell can also include a housing, one or more current collectors, and a high temperature electrically insulating seal. In some cases, a cell can be at least about 4 inches wide, at least about 4 inches deep and at least about 2.5 inches tall. In some cases, a cell can be at least about 8 inches wide, at least about 4 inches deep and at least about 8 inches tall. In some examples, any given dimension (e.g., height, width or depth) of an electrochemical cell can be at least about 1 inch, 2 inches, 2.5 inches, 3 inches, 3.5 inches, 4 inches, 4.5 inches, 5 inches, 5.5 inches, 6 inches, 6.5 inches, 7 inches, 7.5 inches, 8 inches, 8.5 inches, 9 inches, 9.5 inches, 10 inches, 12 inches, 14 inches, 16 inches, 18 inches, 20 inches or greater. In an example, a cell (e.g., each cell) can have dimensions of at least about 4 inches×4 inches×2.5 inches. In another example, a cell (e.g., each cell) can have dimensions of at least about 8 inches×2.5 inches×8 inches. In some cases, the cell may be cylindrical and may have a diameter corresponding to any of the above-mentioned height, width, or depth dimensions. In some cases, a cell may have about at least about 70 Watt-hours of energy storage capacity. A cell may have about at least about 1 Watt-hour of energy storage capacity, 10 Watt-hours of energy storage capacity, 20 Watt-hours of energy storage capacity, 30 Watt-hours of energy storage capacity, 40 Watt-hours of energy storage capacity, 50 Watt-hours of energy storage capacity, 60 Watt-hours of energy storage capacity, 70 Watt-hours of energy storage capacity, 80 Watt-hours of energy storage capacity, 90 Watt-hours of energy storage capacity, 100 Watt-hours of energy storage capacity, 200 Watt-hours of energy storage capacity, 300 Watt-hours of energy storage capacity, 400 Watt-hours of energy storage capacity, 500 Watt-hours of energy storage capacity, 600 Watt-hours of energy storage capacity, 800 Watt-hours of energy storage capacity, 1,000 Watt-hours of energy storage capacity, 1,200 Watt-hours of energy storage capacity, or greater.

A group of cells with a given energy capacity and power capacity may be configured to deliver at least about 10%, at least about 20%, at least about 30%, at least about 40%, at least about 50%, at least about 60%, at least about 70%, at least about 80%, at least about 90%, at least about 95%, or about 100% of a given (e.g., rated) power level. For example, a 1000 kW system may be capable of also operating at 500 kW, but a 500 kW system may not be able to operate at 1000 kW. In some cases, a system with a given energy capacity and power capacity may be configured to deliver less than about 100%, less than about 110%, less than about 125%, less than about 150%, less than about 175%, or less than about 200% of a given (e.g., rated) power level, and the like. For example, the system may be configured to provide more than its rated power capacity for a period of time that is less than the time it may take to consume its energy capacity at the rated power level (e.g., provide power that is greater than the rated power of the system for a period of time corresponding to less than about 1%, less than about 10%, or less than about 50% of the time it would take to provide the rated energy of the system when the power is provided at the rated power of the system).

The term "battery," as used herein, generally refers to an energy storage device with one or more electrochemical cells connected in series and/or parallel. A battery can comprise any number of electrochemical cells. A battery may undergo at least one charge/discharge or discharge/charge cycle ("cycle"). The battery may include at least 1, 2, 3, 4, 5, 6, 7, 8, 9, 10, 20, 30, 40, 50, 60, 70, 80, 90, 100 or more cells.

An energy storage system may include at least 1, 2, 3, 4, 5, 6, 7, 8, 9, 10, 20, 30, 40, 50 or more batteries in parallel. As an alternative, the energy storage system may include at least 1, 2, 3, 4, 5, 6, 7, 8, 9, 10, 20, 30, 40, 50, 100, 200, 500, 1000, 1500, 2000, or more batteries in series. As another alternative, the energy storage system may include at least 1, 2, 3, 4, 5, 6, 7, 8, 9, 10, 20, 30, 40, 50 or more batteries in series and at least 1, 2, 3, 4, 5, 6, 7, 8, 9, 10, 20, 30, 40, 50 or more batteries in parallel.

The term "vertical," as used herein, generally refers to a direction that is parallel to the gravitational acceleration vector (g).

The term "voltage" or "cell voltage," as used herein, generally refers to the voltage of a cell (e.g., at any state of charge or charging/discharging condition). In some cases, voltage or cell voltage may be the open circuit voltage. In some cases, the voltage or cell voltage can be the voltage during charging or during discharging.

Voltages of the present disclosure may be taken or represented with respect to reference voltages, such as ground (0 volt (V)), or the voltage of the opposite electrode in an electrochemical cell.

The term "slot," as used herein, generally refers to a narrow aperture, notch, or slit in an element of the rack (e.g., structural elements and rails) or an element of the tray (e.g., runners or cross-structural support member). A tray may include one or more runners. The runners may have one or more slots. The slots may permit joining or mating with a tab. Joining of the slot and tab may permit assembly of the tray and permit structural support for the tray.

The term "tab," as used herein, generally refers to a protrusion extending from a cross-structural support member on a tray. The tab may comprise a shape that permits the tab to join or couple with a slot (e.g., the tab may extend into the slot or fit within the slot). The slot and tab may be joined or coupled by welding or brazing. The slot and tab joint may not permit disassembly of the tray elements.

The term "fastener," as used herein, generally refers to a hardware device that non-permanently mechanically joins or affixes two or more objects together such that the two or more objects may be removed or dismantled without damaging the joining components. Fasteners may include, but are not limited to, screws, bolts, pins, clips, rivets, latches, anchors, or other types of fasteners. A fastener may not be a slot. A fastener may not be a tab.

The term "pass-through," as used herein, generally refers to a port or opening through which wires, sensors and/or high current/voltage (e.g., cell current or voltage) connections may pass in order to connect electrochemical cells (e.g., inside the rack) to other components in the energy storage system (e.g., outside the rack). The rack, thermal insulation surrounding the rack, and/or the enclosure surrounding the rack may have one or more pass-through(s). A pass-through may be sealed or may not be sealed. In an example, a pass through may include a grommet (e.g., rubber grommet) or other insert for holding wires or connections and/or sealing the pass-through.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Electrochemical Cells

An energy storage system may comprise one or more electrochemical cells ("cells"). An electrochemical cell ("cell") can be configured to deliver electrical energy (e.g., electrons under potential) to a load, such as, for example, an electronic device, another energy storage device or a power grid. The plurality of cells may be connected in series and/or parallel. The cells may be electrochemical cells.

An energy storage system may comprise one electrochemical cell or a plurality of electrochemical cells. The electrochemical cell of the plurality of electrochemical cells may comprise a negative electrode, electrolyte and positive electrode. At least two of the negative electrode, the electrolyte and the positive electrode may be in a liquid state at an operating temperature of the electrochemical cell. For example, the electrolyte and the negative electrode may be in a liquid state while the positive electrode is in a solid or semi-solid state. The electrochemical cell of the disclosure can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge.

An electrochemical cell may be a liquid metal battery cell. The liquid metal battery cell can include a liquid electrolyte arranged between a negative liquid (e.g., molten) metal electrode and a positive liquid (e.g., molten) metal, metalloid and/or non-metal electrode. A liquid metal battery cell may have a negative electrode comprising a molten alkaline earth metal (e.g., magnesium, calcium) or alkali metal (e.g., lithium, sodium, potassium), an electrolyte, and a solid, semi-solid, or molten metal positive electrode. The electrolyte can include a salt (e.g., molten salt), such as an alkali or alkaline earth metal salt. The alkali or alkaline earth metal salt can be a halide, such as a fluoride, chloride, bromide, or iodide of the active alkali or alkaline earth metal, or combinations thereof.

The solid, semi-solid, or molten metal positive electrode can include, for example, one or more of tin, lead, bismuth, antimony, tellurium and selenium. For example, the positive electrode can include a lead (Pb) or a lead-antimony (Pb—Sb) alloy. The positive electrode may include an antimony (Sb), antimony-tin (Sb—Sn), antimony-lead (Sb—Pb), or antimony-tin-lead (Sb—Sn—Pb) alloy. The positive electrode can also include one or more transition metals or d-block elements (e.g., zinc (Zn), cadmium (Cd), mercury (Hg)) alone or in combination with other metals, metalloids or non-metals, such as, for example, a zinc-tin (Zn—Sn) alloy or cadmium-tin (Cd—Sn) alloy. The positive electrode can comprise a metal or metalloid that has one stable oxidation state (e.g., a metal with a single or singular oxidation state). Any description of a metal or molten metal positive electrode, or a positive electrode, herein may refer to an electrode including one or more of a metal, a metalloid and a non-metal. The positive electrode may contain one or more of the listed examples of materials. The molten metal positive electrode can include lead and antimony. The molten metal positive electrode may include an alkali or alkaline earth metal alloyed in the positive electrode. The liquid metal battery cell may have calcium as the negative electrode, and antimony as the positive electrode. The liquid metal battery cell may have calcium alloy as the negative electrode, and antimony as the positive electrode. The liquid metal battery cell may have lithium as the negative electrode, and antimony as the positive electrode. The liquid metal battery cell may have lithium as the negative electrode, and bismuth as the positive electrode. The liquid metal battery cell may have calcium as the negative electrode, and bismuth as the positive electrode. The liquid metal battery cell may have calcium alloy as the negative electrode, and bismuth as the positive electrode. The liquid metal battery cell may have calcium as the negative electrode, and lead as the positive electrode. The liquid metal battery cell may have a liquid calcium alloy as the negative electrode, a molten salt electrolyte, and a cathode comprising solid metal, metalloid, or intermetallic particles dispersed in molten salt. In an example, the intermetallic particles may comprise antimony (Sb).

In some cases, the negative electrode and/or the positive electrode of an electrochemical cell may be in the liquid state at an operating temperature of the energy storage device. Alternatively, or in addition to, the negative electrode or positive electrode may be solid or semi-solid at an operating temperature of the energy storage device. In an example, the negative electrode is in a liquid state and the positive electrode is in a solid state at the operating temperature of the energy storage device. To maintain the electrode(s) in the liquid state(s), the battery cell may be heated to any suitable temperature. The battery cell may be heated to and/or maintained at a temperature of about 100° C., about 150° C., about 200° C., about 250° C., about 300° C., about 350° C., about 400° C., about 450° C., about 500° C., about 550° C., about 600° C., about 650° C., or about 700° C. The battery cell may be heated to and/or maintained at a temperature of at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 650° C., at least about 700° C., at least about 800° C., at least about 900° C., or greater. The negative electrode, electrolyte and positive electrode can be in a liquid (or molten) state. The battery cell may be heated to between about 200° C. and about 600° C., between about 500° C. and about 550° C., or between about 450° C. and about 575° C.

The electrochemical cell may be at least partially or fully self-heated. For example, a battery may be sufficiently insulated, charged, discharged and/or conditioned at sufficient rates, and/or cycled a sufficient percentage of the time to allow the system to generate sufficient heat through inefficiencies of the cycling operation that cells may be maintained at a given operating temperature (e.g., a cell operating temperature above the freezing point of at least one of the liquid components) without additional energy to be supplied to the system to maintain the operating temperature. A battery may not consume any energy after the battery is initiated.

Electrochemical cells of the disclosure may be adapted to cycle between charged (or energy storage) modes and discharged modes. An electrochemical cell can be fully charged, partially charged or partially discharged, or fully discharged.

Energy Storage Systems

The present disclosure provides energy storage systems for storing energy. Energy storage systems of the present disclosure may charge and/or discharge when electrically coupled to a load (e.g., a resistor, an electrical appliance, or a power grid).

In an aspect, the present disclosure provides energy storage systems comprising a plurality of electrochemical cells and a rack supporting the plurality of electrochemical cells. An electrochemical cell of the plurality of electrochemical cells may comprise a negative electrode, electrolyte and positive electrode. At least one, two or all of the negative electrode, the electrolyte and the positive electrode may be in a liquid state at an operating temperature of the electrochemical cell.

In another aspect, the present disclosure provides energy storage systems comprising a plurality of electrochemical cells and a rack. The electrochemical cells may comprise a negative electrode, electrolyte, and positive electrode. The rack may comprise a plurality of trays comprising a slot and a tab. The electrochemical cells may be disposed on the tray. The rack may support (e.g., mechanically) the plurality of electrochemical cells.

In another aspect, the present disclosure provides energy storage systems comprising a plurality of electrochemical cells and a rack. The electrochemical cells may comprise a negative electrode, electrolyte, and positive electrode. The rack may comprise a plurality of trays. A tray of the plurality of trays may comprise support units (e.g., runners and/or cross-structural support members) that are not coupled to one another via fasteners (e.g., bolts, rivets, pins, etc.). The electrochemical cells may be disposed on the tray. The rack may support (e.g., mechanically) the plurality of electrochemical cells. The tray may support (e.g., mechanically) the plurality of electrochemical cells.

In another aspect, an energy storage system may comprise an enclosure, a plurality of electrochemical cells, and a rack supporting the plurality of electrochemical cells. The energy storage system may further comprise a rack external cover that may be separate from the rack, or may be part of the rack. The rack may be disposed in the enclosure. The energy storage system may further comprise one or more panels between the rack and the enclosure. The one or more panels may be configured to form one or more insulation sections. The energy storage system may further comprise insulation material disposed in the one or more insulation sections. The rack external cover may prevent the flow of insulation in the insulation sections onto a tray in the rack and/or electrochemical cells on a tray. Alternatively, the system may be designed without a rack external cover and insulation may flow onto and/or contact a tray in the rack and/or electrochemical cells on a tray. The number of the insulation sections may be at least 1, 2, 3, 4, 5, 6, 7, 8, 9, 10, 11, 12, 13, 14, 15, 16, 17, 18, 19, 20 or greater.

The operating temperature of the electrochemical cell may be about 100° C., 150° C., 200° C., 250° C., 300° C., 350° C., 400° C., 450° C., 500° C., 550° C., 600° C., 650° C., or 700° C. The operating temperature of the electrochemical cell may be at least about 100° C., 150° C., 200° C., 250° C., 300° C., 350° C., 400° C., 450° C., 500° C., 550° C., 600° C., 650° C., 700° C., 800° C., 900° C. or greater. At least one of the negative electrode, electrolyte, or positive electrode may be in a liquid state at an operating temperature (e.g., greater than 250° C.) of the electrochemical cells. At least two of the negative electrode, electrolyte, or positive electrode may be in a liquid state at an operating temperature (e.g., greater than 250° C.) of the electrochemical cells. All of the negative electrode, electrolyte, or positive electrode may be in a liquid state at an operating temperature (e.g., greater than 250° C.) of the electrochemical cells.

The plurality of electrochemical cells may be connected in series. The plurality of electrochemical cells may be connected in parallel. Some of the plurality of electrochemical cells may be connected in series, and some of the plurality of electrochemical cells may be connected in parallel.

The energy storage system may comprise a rack. The rack may be part of a plurality of racks in the energy storage system. The number of racks of the energy storage system may be at least 1, 2, 3, 4, 5, 6, 7, 8, 9, 10, 11, 12, 13, 14, 15, 16, 17, 18, 19, 20 or greater. The rack may comprise a plurality of trays. The number of trays of one of the racks may be at least 1, 2, 3, 4, 5, 6, 7, 8, 9, 10, 11, 12, 13, 14, 15, 16, 17, 18. 19, 20, or greater.

The tray may comprise one or more tray elements that are assembled together to form the tray. The tray and/or tray element may comprise a slot and a tab. The slot and tab may be configured to couple together, such as by mating with each other. The tray may comprise a plurality of slots and/or a plurality of tabs. The number of the slots of the tray may be at least 1, 2, 3, 4, 5, 6, 7, 8, 9, 10, 11, 12, 13, 14, 15, 16, 17, 18, 19, 20 or greater. The number of the tabs of the tray may be at least 1, 2, 3, 4, 5, 6, 7, 8, 9, 10, 11, 12, 13, 14, 15, 16, 17, 18, 19, 20 or greater. The number of the slots of the tray may be the same as the number of the tabs of the tray. Alternatively, or in addition to, the number of the slots of the tray may be different from the number of the tabs of the tray. The slot may comprise an opening. The opening may have various designs, shapes, and/or sizes. The trays may support the one or more electrochemical cells. For example, a tray may support at least 1, 2, 4, 5, 6, 7, 8, 9, 10, 11, 12, 13, 14, 15, 16, 17, 18, 19, 20, 30, 40, 50, or more electrochemical cells.

The energy storage system may further comprise a rack external cover that partially or fully covers one or more racks in the energy storage system. The rack external cover may be part of a rack or may be separate from the rack. In an example, the rack external cover is separate and separable from the rack (e.g., may be removed). In another example, the rack external cover is integrated with the rack and not removable. In another example, a portion of the rack external cover is integrated with the rack and another portion is not integrated (e.g., is removable). The rack external cover may be used to prevent powdered thermal insulation from contacting or covering electrochemical cells on trays that are being held by the rack and/or used to electrically isolate the rack from other elements of the energy storage system. The rack external cover may fully cover one rack. The rack external cover may partially cover one rack. The rack external cover may fully or partially cover two or more adjacent racks. The rack external cover may comprise a front cover. The front cover of the rack external cover may be designed to allow for the loading of trays into the rack when the front cover is removed and allow for the internal volume of the rack to be sealed from insulation outside the rack and rack external cover to prevent the insulation from contacting and covering some of the electrochemical cells on the trays. The rack external cover may be electrically connected to the rack. The rack external cover may be physically separated from the rack and comprise its own structural rack and/or may be electrically isolated from the rack. The rack external cover may be thermally connected to the rack. Alternatively, or in addition to, the rack external cover may be thermally isolated from the rack. One or more of the plurality of electrochemical cells may be disposed on the tray. The number of the plurality of electrochemical cells disposed on one tray may be at least 1, 2, 3, 4, 5, 6, 7, 8, 9, 10, 11, 12, 13, 14, 15, 16, 17, 18, 19, 20 or greater. The number of the plurality of electrochemical cells disposed on one tray of the rack may be the same as the number of the plurality of electrochemical cells disposed on another tray of the rack. The number of the plurality of electrochemical cells disposed on one tray of the rack may be different from the number of the plurality of electrochemical cells disposed on another tray of the rack.

The rack or a set of adjacent racks may comprise one or more heaters for supplying thermal energy to the plurality of electrochemical cells. The number of the heaters of the rack may be at least 1, 2, 3, 4, 5, 6, 7, 8, 9, 10, 11, 12, 13, 14, 15, 16, 17, 18, 19, 20 or greater. The heater may be placed between the rack and the rack external cover. The heater may be placed inside the rack. The heater may be placed next to a tray. The heater may be placed on a tray. The heater may be placed on portions of the rack that are adjacent to or in contact with the rack external cover or adjacent racks. The heater may be placed outside the rack external cover. The heater may be placed near to locations along the inner or external surface of the rack or rack external cover that have higher thermal heat leak paths are therefore require more heating to reduce thermal gradients within the volume enclosed by the rack. Alternatively, or in addition to, the heater may be disposed near an inlet and/or an outlet to the rack. The inlet or outlet of the rack may be configured to pass electrical connections and other electrical components from the inside the rack to outside the rack.

The rack and/or rack external cover may be in an enclosure. The enclosure may have various designs, shapes, and/or sizes. Examples of possible shapes or designs include but are not limited to: mathematical shapes (e.g., circular, triangular, square, rectangular, pentagonal, or hexagonal), two-dimensional geometric shapes, multi-dimensional geometric shapes, curves, polygons, polyhedral, other geometric shapes, or partial shapes or combination of shapes thereof.

At least two of the enclosure, rack external cover, rack and tray may be formed of the same material. The enclosure, rack external cover, rack, and tray may be formed of different materials. The enclosure, rack external cover, rack and/or tray may be formed of a metallic (or metal-containing) material, polymeric material, and/or composite material. The metallic material may include one or more elemental metals. Examples of metallic materials include aluminum, stainless steel alloys (e.g., 200-series, 300-series, 400-series, etc.), commercially pure titanium, titanium alloys, silver alloys, copper alloys, Grade 5 titanium, superelastic titanium alloys, cobalt-chrome alloys, and superelastic metallic alloys (e.g., Nitinol or super elasto-plastic metals).

The rack may be placed on one or more insulation boards in the enclosure. The number of insulation boards may be at least 1, 2, 3, 4, 5, 6, 7, 8, 9, 10, 11, 12, 13, 14, 15, 16, 17, 18, 19, 20 or greater. The insulation boards may have various designs, shapes, and/or sizes. Examples of possible shapes or designs include but are not limited to: mathematical shapes (e.g., circular, triangular, square, rectangular, pentagonal, or hexagonal), two-dimensional geometric shapes, multi-dimensional geometric shapes, curves, polygons, polyhedral, other geometric shapes, or partial shapes or combination of shapes thereof. Different insulation boards may have different shapes, designs, and/or sizes. Different insulation boards may be in the same shape, design, and/or size.

The energy storage system may comprise insulation material between the rack and/or rack external cover and the enclosure. The insulation material may be in powder form. If the insulation materials are in the form of powders, the particle size (e.g., cross-section) of an individual particle in the powder may be at most about 1 centimeter (cm), 1000 micrometers (µm), 500 µm, 400 µm, 300 µm, 200 µm, 100 µm, 50 µm, 10 µm, 1 µm, 0.5 µm, 0.1 µm or smaller. The insulation materials may comprise or be, but not limited to, silica, microporous silica, alumina silica, alumina silicate, magnesia, vacuum insulated panel, silica aerogel, cementitious foam, perlite loose-fill, vermiculite loose-fill, aerated concrete, cellular concrete, brick, glass, poured concrete, fiberglass, and mineral wool or any other thermally insulating materials.

Reference will now be made to the figures, wherein like numerals refer to like parts throughout. It will be appreciated that the figures and features therein are not necessarily drawn to scale.

FIG. 1 shows an example of an energy storage system. The energy storage system may comprise an enclosure 101, an enclosure front cover 102, an insulation zone 103, and a rack external cover 104. The enclosure front cover 102 may be configured to seal (e.g., hermetically seal, non-hermetically seal, seal sufficiently to prevent significant flow of powder insulation from the insulation zone to outside the enclosure) the enclosure 101. An insulation zone 103 may be placed inside the enclosure 101. The insulation zone 103 may comprise insulation materials surrounding a rack 105 and/or rack external cover 104. The insulation materials may be held between the rack external cover 104 and the enclosure 101. The insulation materials may be in powder form. In the illustrated example, the energy storage system may comprise a rack 105. The rack 105 may be sealed by a rack front cover 106. The rack may comprise a plurality of trays 107. The number of the plurality of trays may be at least 1, 2, 3, 4, 5, 6, 7, 8, 9, 10 or greater. The rack may be configured to support a plurality of cells. The cells may be electrochemical cells. One or more of the plurality of electrochemical cells may be disposed on one of the plurality of trays 107. The rack 105 and/or the rack external cover 104 may comprise one or more heaters. The heaters may be configured to supply thermal energy to the plurality of electrochemical cells. The rack 105 or rack external cover 104 may be placed on one or more insulation boards. The energy storage system may comprise a plurality of racks 105. The number of the plurality of racks may be at least 2, 3, 4 or greater. The enclosure may comprise one or more ports 108 located on or near the top of the enclosure. The enclosure may further comprise one or more removal ports 109 located at or near the bottom of the enclosure.

Figure 2:
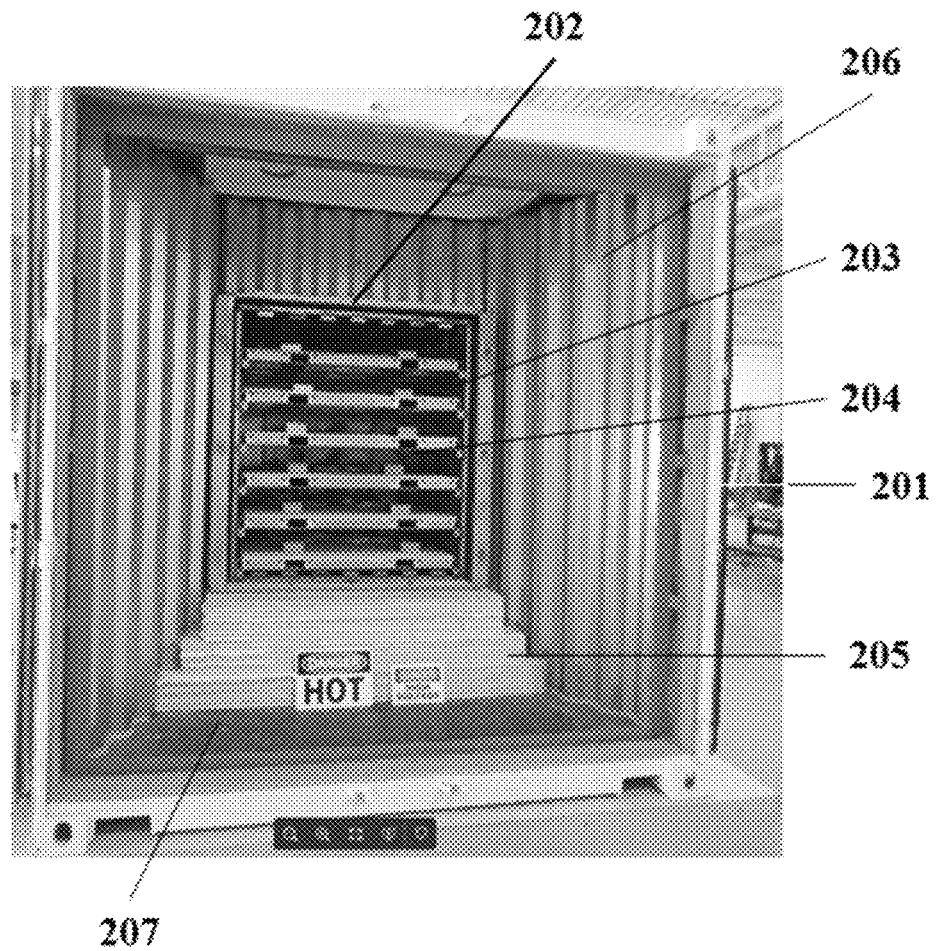
FIG. 2 shows an example of a front view of the energy storage system without an enclosure front cover.

FIG. 2 shows a front view of an example energy storage system without the enclosure front cover. The energy storage system may comprise an enclosure 201 and a rack external cover 202. The rack external cover 202 may be placed inside the enclosure 201. In the illustrated example, the energy storage system may comprise a rack 203. The rack may comprise a plurality of trays 204. The number of the plurality of trays may be at least 1, 2, 3, 4, 5, 6, 7, 8, 9, 10 or greater. One or more cells may be disposed on one of the plurality of trays 204. The cells may be electrochemical cells. The cells may be in electrical communication. In an example, the cells are in electrical communication in a series configuration (e.g., the negative electrode of one cell is in electrical communication with the positive electrode of another cell). In another example, the cells are in electrical communication in a parallel configuration (e.g., the negative electrode of one cell is in electrical communication with the negative electrode of another cell). The rack external cover 202 may be placed on one or more insulation boards 205. Between the rack external cover 202 and the enclosure 201, there may be one or more panels 206. The one or more panels 206 may be configured to form one or more insulation sections 207. The one or more panels 206 may be sheet metal. The sheet metal panel may be planar or may be corrugated to improve mechanical rigidity. The panels may be designed from lower cost and/or lower weight materials or assemblies, such as expanded metal mesh combined with thin sheet or foil (e.g., stainless steel foil). The insulation sections 207 may comprise insulation materials. The one or more insulation sections 207 may be configured to separate the insulation materials. The insulation sections may allow portions of the insulation materials to be removed from the energy storage system. In this situation, outsiders may gain access to the rack 202 or the electrochemical cells for maintenance or replacement purposes without removing all the insulation materials.

Racks and Trays

An energy storage system may comprise a rack supporting the plurality of cells. The rack may be in an enclosure. The rack may provide structural support, participate and/or aid in forming the interconnections. The rack may have one or more fluid flow paths for bringing a thermal management fluid in thermal communication with at least a subset of the plurality of electrochemical cells. The thermal management fluid may be any suitable fluid, including but not limited to air, purified/cleaned air, a gas (e.g., helium, argon, supercritical $CO_2$), oil, water, molten salt, or steam. Examples of gases are argon or nitrogen ($N_2$). Ambient air may be used. The thermal management fluid may have a high heat capacity. The fluid flow paths may be an integral part of the rack (e.g., the thermal management fluid may flow through the rack). Alternatively, or in addition to, the fluid flow paths may be separate from the rack. The fluid flow paths may separate the thermal management fluid such that the thermal management fluid does not come in contact with the cells.

The rack may have one or more functions. Examples of such function(s) may include, but are not limited to: (i) providing mechanical support to the cells and/or groups of cells within the device/system, and/or (ii) providing a path for thermal management fluid to flow to aid in thermal management of the battery (or battery system). The energy storage system may comprise a rack external cover. The rack external cover may also be considered to be part of the rack. The rack may comprise additional components. The additional components may be, for example, tubes, pipes, or enclosed trusses. The additional elements may be welded with the rack or be operatively coupled with the rack. Thermal management fluid flow pathways may be welded or otherwise connected or joined to one or more portions of the rack structure.

The rack may further comprise a rack external cover. The rack external cover may be electrically connected to the rack. The rack external cover may be electrically isolated from the rack. The rack external cover may be removable. The rack external cover may be partially removable. The rack external cover may not be removable. The rack external cover may be thin sheet metal skin. The rack external cover may comprise a rack front cover. The rack front cover may be removable. The rack front cover may not be removable.

Figure 3:
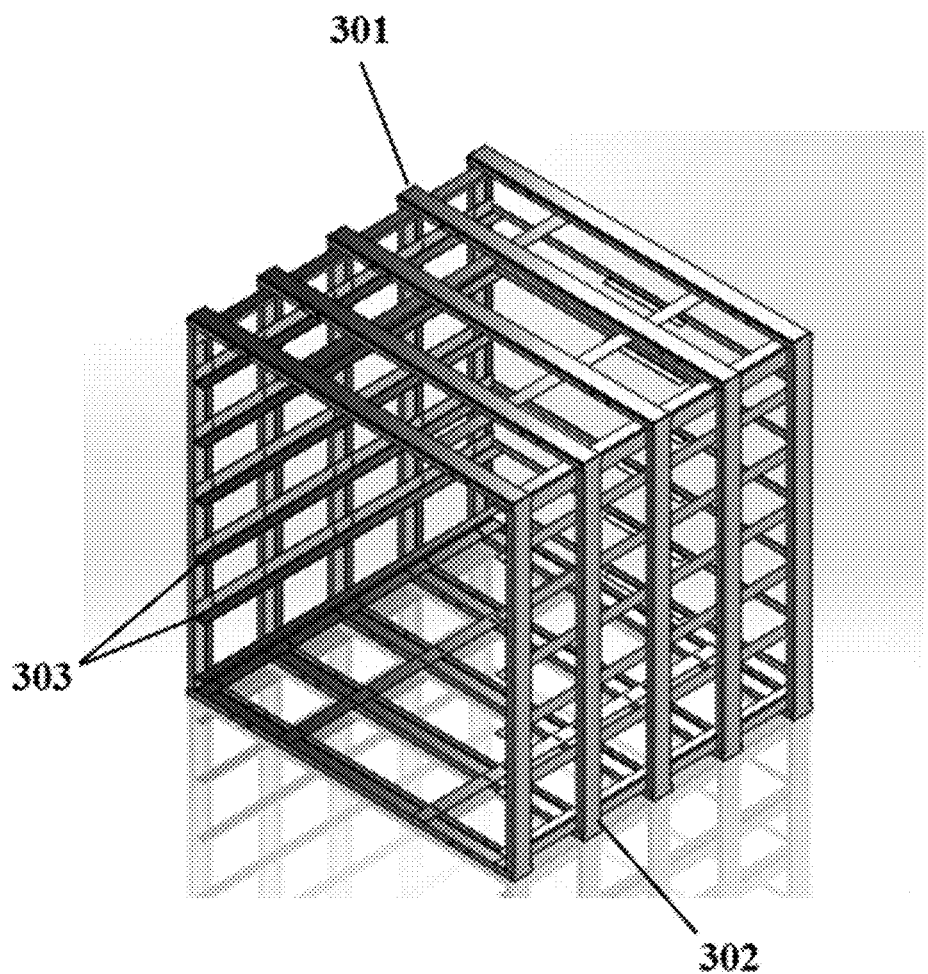
FIG. 3 shows an example of a portion of a rack of the energy storage system.

FIG. 3 shows an example of a portion of a rack of the energy storage system. The rack 301 may comprise rack elements such as structural supports 302 (e.g., pieces of the rack that can be joined together to make the rack) and rails 303. The rack elements may comprise, for example, tubes, pipes, or enclosed trusses. The rack elements may be welded together. The rack 301 may be integrally formed. The rack 301 and/or portion(s) thereof can be joined with other racks in the device/system. Thermal management fluid flow pathways may be welded or otherwise connected or joined to one or more portions of the rack. For example, external tubing may be joined to one or more fluid inlets or outlets on the rack 801 or on individual rack element(s). The fluid inlet(s)/outlet(s) may be in fluid communication with fluid flow conduits in rack or rack element(s).

The rack may be of any suitable size or shape. The rack may be a rectangular box, e.g., comprising any number of vertical and horizontal rack elements as shown in FIG. 3. The rack can mechanically and/or structurally support the electrochemical cells in a series and/or parallel configuration. The rack may partition the electrochemical cells into subsets having any number of cells (e.g., groups of cells as described elsewhere herein). The electrochemical cells within a subset can be connected in parallel and/or series. Further, as described in greater detail elsewhere herein, the rack can be joined and/or otherwise connected with other rack(s). The racks may be used to assemble the groups of cells into larger units. The rack (or any portion thereof) may be configured to interface with thermal insulation. The rack may contain any number of electrochemical cells (e.g., 1, 2, 3, 4, 5, 6, 7, 8, 9, 10, 11, 12, 13, 14, 15, 16, 17, 18, 19, 20, or more). The rack may contain at least about 5, at least about 10, at least about 20, at least about 30, at least about 40, at least about 50, at least about 60, at least about 80, at least about 100, at least about 200, at least about 300, at least about 400, at least about 500, at least about 600, or at least about 700 electrochemical cells.

The rack may comprise one or a plurality of fluid flow paths. In some implementations, the fluid flow paths may be parallel. For example, a plurality of parallel fluid flow paths may be provided. At least a portion of the fluid flow paths may be separately controllable (e.g., by a control system of the disclosure). Such control may include opening/closing of one or more flow paths, control or maintenance of flow rate(s), control or maintenance of fluid temperature, etc. For example, a fluid flow rate (e.g., mass flow rate, volumetric flow rate) through at least two of the parallel fluid flow paths can be separately controllable. The thermal management fluid can enter fluid flow paths through one or more openings. The fluid can then flow through the rack through any number of (e.g., orthogonal, parallel) fluid flow paths. An individual fluid flow path may have a cross-sectional geometry that is circular, square, rectangular, oval, or any other suitable shape. The fluid flow path may have a cross sectional area of less than about 0.1 $cm^2$, less than about 0.5 $cm^2$, less than about 1 $cm^2$, less than about 2 $cm^2$, less than about 5 $cm^2$, less than about 10 $cm^2$, less than about 20 $cm^2$, less than about 50 $cm^2$, or less than about 100 $cm^2$. The fluid can enter or exit the fluid flow paths through one or more openings. The fluid may alternatively or additionally enter and/or exit the rack on any face or boundary of the rack (e.g., on a face perpendicular or adjacent to the faces/boundaries comprising the inlet/outlet). The thermal management fluid may enter the rack through a first opening, be divided into a plurality of fluid flow paths, and exit through a second opening. The thermal management fluid may enter the rack through two or more distinct openings. The thermal management fluid may flow through distinct thermal flow paths (e.g., each in fluid communication with one or more distinct openings, such as, for example, a distinct inlet and/or a distinct outlet) that separate the fluid in each path, thus enabling the system to separately control fluid flow rate through each path (e.g., each controlled by their own fluid flow control actuator, such as, for example, a life-gate or valve). One or more structural elements of the rack (e.g., support members or trays) may be configured such that the thermal management fluid flow path goes through the structural element. In an example, one or more of the structural elements make up the fluid flow path for the thermal management fluid.

The thermal management fluid may not contact the electrochemical cells (e.g., the thermal management fluid can be retained within the rack elements). The rack can be made from any suitable material including plastic, aluminum, steel or stainless steel. The rack can be resistant to corrosion. The rack may contact the thermal management fluid and may be chemically resistant to the thermal management fluid. The thermal management fluid may not come in contact with cells (e.g., thereby increasing cell life and reducing system complexity). The rack can be chemically resistant to reactive materials (e.g., reactive metals), such as, for example, reactive metals used in the electrochemical cells.

The rack can have a feature or characteristic (e.g., geometric feature) that selectively accelerates heat transfer (e.g., the thickness or composition of the rack elements and/or the cross-sectional area or diameter of fluid flow path(s) can be different to allow more or less heat to pass between the electrochemical cells and the thermal management fluid). For example, a dimension of the rack (e.g., thickness, cross-sectional area or diameter of a fluid flow path in the rack, or thermal mass of the rack as a whole), or a portion thereof, can be configured to selectively accelerate heat transfer (e.g., in accordance with location of the rack or rack portion within the system). Various geometric features may enable various configurations of thermal management fluid routing. The fluid flow path may be routed between cells or groups of cells to permit selective removal of heat from the system.

The tray and rack may be designed to minimize weight and maximize tray loading density (e.g., to increase the amount of energy storage capacity in an energy storage system enclosure). The tray may be designed to be liftable by a fork lift to load into the rack. To minimize the space between vertically stacked racks, the rack may be designed with runners (e.g., structural elements that run horizontally from the front of the rack to the rear of the rack along the walls of the rack) and the runners may be less than or equal to about 10 inches (in), 8 in, 6 in, 5 in, 4 in, 3 in, 2 in, 1 in, or less wide. The tray may be designed such that the runners on the tray match the rails on the rack to allow for easy loading. For example, when the tray is brought up to the front edge of the rack, the tray runners can be used to slide the tray into the rack along the rails in the rack. To minimize the vertical space required during assembly, the tray may be pushed and/or pulled along the rail (e.g., using a winch system).

Figure 4:
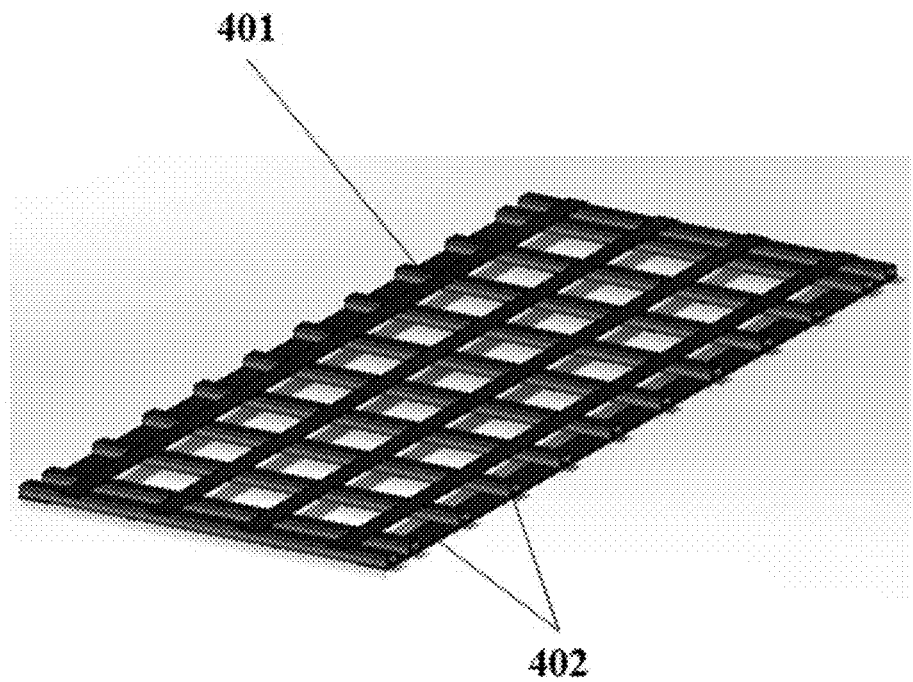
FIG. 4 shows an example of a tray in the energy storage system.

The rack may comprise a plurality of trays. The rack and/or tray may use a self-fixturing weldment scheme coupled with a dollars per strength metric that may achieve a low-cost system. The self-fixturing may reduce assembly labor per unit. A dollars per assembled strength metric may be utilized to ensure the manufacturing process to be cost efficient. A self-fixturing weldment scheme may include use of a slot and tab, interlocking, features to allow temporary fasteners to hold the components in place for the joining process (e.g., welding or brazing) and may be removed after the joining process is complete, or other self-aligning and self-locating features. For example, the components may be aligned in a visual manner according to markings on the components. The aligned features may be spot welded or seam welded to form a mechanically robust structure. FIG. 4 shows an example of a tray in the energy storage system. The tray may have one or more functions. Examples of such function(s) include, but are not limited to: (i) providing mechanical support to the cells and/or groups of cells within the device/system, (ii) ensuring cells or groups of cells do not directly short to one another or short to grounded connections, (iii) maintaining electrical isolation between cells and/or groups of cells and other non-electrically active structural members, and/or (iv) providing a path for thermal management fluid to flow to aid in thermal management of the battery (or battery system). For example, the elements (e.g., cross-structural supports, vertical supports, rails, or runners) of the rack and/or tray may include one or more pathways for flowing a cooling fluid. The rack and/or tray may include pathways that are sealed such that the cooling fluid does not contact the electrochemical cells. The tray 401 may comprise tray elements 402. The tray elements 402 may comprise, for example, a slot and a tab or other interlocking or self-fixturing feature. The tray elements 402 may be welded together. The tray 401 and/or portion(s) thereof can be joined with other components (e.g., tray, rack, rack external cover) in the system. Thermal management fluid flow pathways may be welded or otherwise connected or joined to one or more portions of the tray 401. The tray may be fixed into the rack (e.g., welded, brazed, fastened, or otherwise immobilized in place). Alternatively, or in addition to, the tray may be removable from the rack. The tray may be assembled and/or fixed to the rack without the use of fasteners.

The trays may have a long dimension and a short dimension. The tray may include runners with a long dimension that is parallel to a long dimension of the tray. The tray may have cross-structural support members with a long dimension that is parallel to the short dimension. The tray may have at least 2, 3, 4, 5, 6, 8, 10, or more runners. The tray may have at least 1, 2, 3, 4, 6, 8, 10, 12, 15, 20, or more cross-structural support members. The tray may include more cross-structural support members than runners. The cross-structural support members may provide mechanical support for the electrochemical cells within the rack. The tray may have an aspect ratio of width to length (e.g., short dimension to long dimension) that is less than or equal to about 1, 0.9, 0.8, 0.7, 0.6, 0.5, 0.4, 0.3, 0.2, 0.1, or less. The tray may have an aspect ratio that is from about 0.1 to 0.2, 0.1 to 0.3, 0.1 to 0.4, 0.1 to 0.5, 0.1 to 0.6, 0.1 to 0.7, 0.1 to 0.8, 0.1 to 0.9, or 0.1 to 1. In an example, the tray has an aspect ratio that is less than or equal to about 0.5.

Figure 5A:
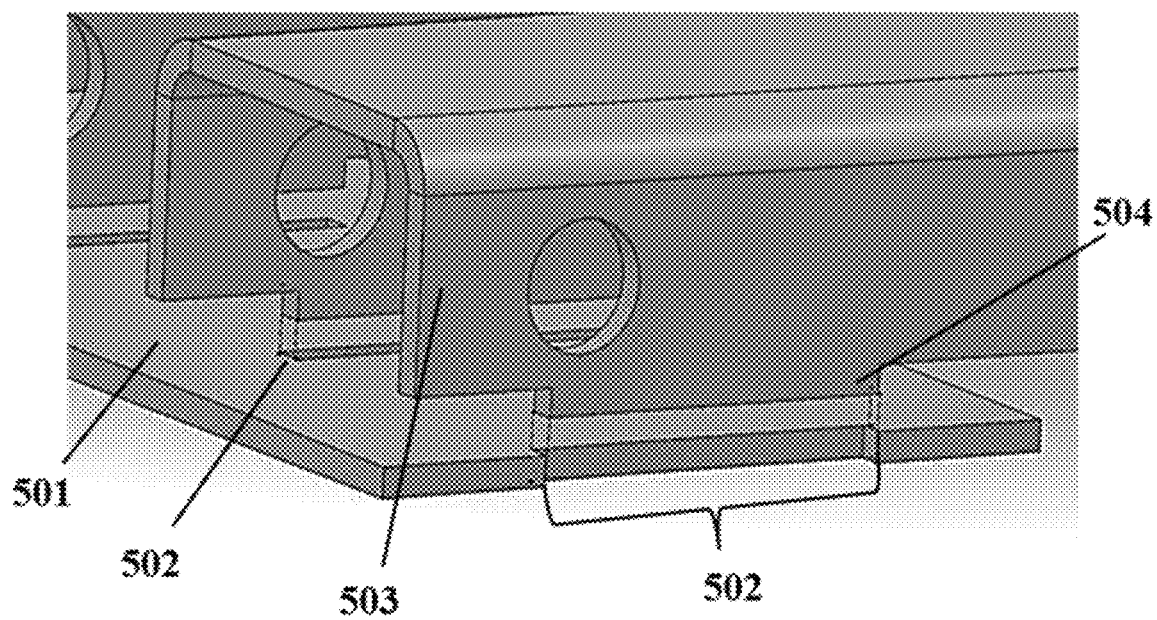
FIGS. 5A and 5B show an example of an enlarged view of the tray in the energy storage system.
Figure 5B:
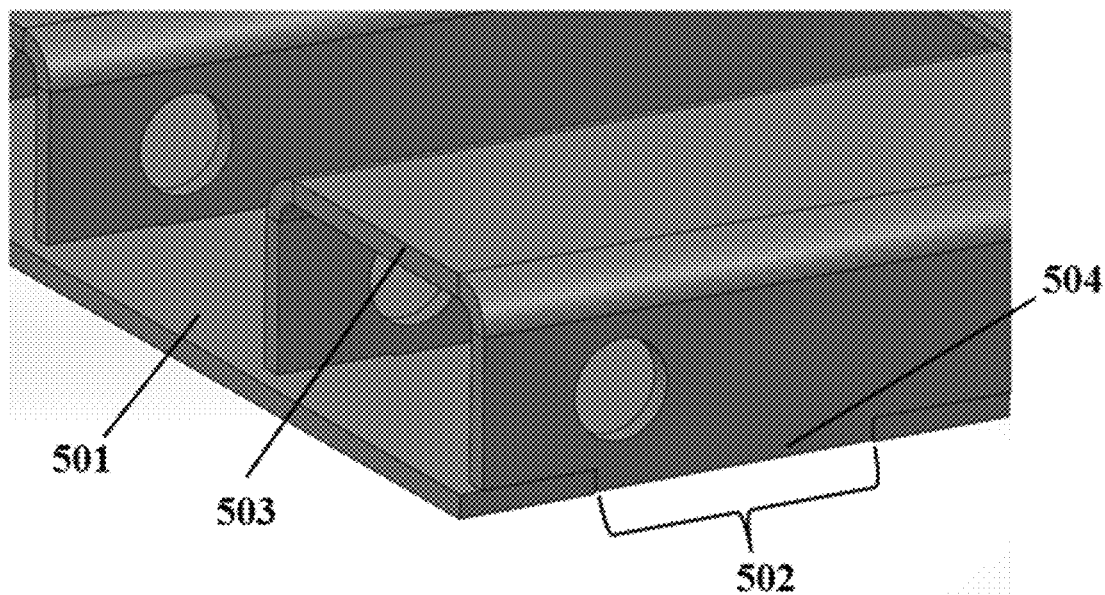

FIGS. 5A and 5B show an example of an enlarged view of the tray in the energy storage system. The tray may comprise one or more tray elements. FIG. 5A shows an example of tray elements prior to assembly. FIG. 5B shows an example of assembled tray elements. Tray elements may include one or more runners 501 and/or cross-structural support members 503. The runners 501 may extend the length of one or more sides of the tray. In an example, the runners 501 on two sides of the tray may each extend the length of the side of the tray. In another example, runners 501 on each side of the tray each extend the length of four sides of the tray. The rack may comprise rails and the runners of the tray may be disposed adjacent to the rails (e.g., the rails may mechanically support via the contact between the rails and the runners). The tray may be fixed in place by a fastener or weld between the rail of the rack and the runner of the tray. Alternatively, or in addition to, one or more of the runners of the tray and the rail of the rack may be the same element, thus, the tray may be fixed in the rack (e.g., the tray may not be removable). The runners 501 may comprise one or more slots 502. Each runner may comprise at least 1, 2, 3, 4, 5, 6, 8, 10, 12, 15, 20, or more slots. The slots 502 may be designed or configured to receive a tab 504. The tab 504 may be a protrusion on one or more sides of the cross-structural support member 503. Each cross-structure support member 503 may include at least 1, 2, 3, 4, 5, 6, 8, 10, 12, 15, 20, or more tabs. Alternatively, or in addition to, the runner may comprise tabs and the cross-structural support member may comprise mating slots. An individual tab 504 may be mated to an individual slot 502 (e.g., each tab may have a corresponding slot in which it inserts into). The tab 504 may have various designs, shapes, and/or sizes. The tab 504 may be dimensioned to fit in the slot 502. The tab 504 may enter and interlock with the slot 502. The slot 502 and tab 504 may permit the assembly of the tray without tools. Alternatively, or in addition to, the tab 504 may be joined in the slot 502 using welding, brazing, or another mechanical connection. The tray may be configured to hold a plurality of cells. The number of cells on the tray may be at least 1, 2, 3, 4, 5, 6, 7, 8, 9, 10, 15, 20, 30, 40, 50, 75, 100, 125, 150, 175, 200, 250, 300, 400, 500, or more. The tray may be configured to or may mechanically support the plurality of cells. One or more of the plurality of electrochemical cells may be disposed on the tray. In one example, one tray of the plurality tray may hold 100 electrochemical cells, and one rack may comprise 5 trays such that the rack holds 500 electrochemical cells. In another example, one tray of the plurality of trays may hold 100 electrochemical cells, one rack may comprise 5 trays, and one enclosure may comprise two racks such that the enclosure holds 1000 electrochemical cells.

The cells on a tray may be configured such that the individual electrochemical cells (e.g., the housing or other component of the cell) are not in contact with one another (e.g., do not form a parallel electrical connection). Avoiding a direct connection between the cells may be permitted or accomplished by positioning cells at least a small distance apart such that there is a gap between the electrochemical cells. For example, a gap between the electrochemical cells may be greater than or equal to about 0.0625 inches (in), 0.125 in, 0.25 in, 0.5 in, 0.75 in, 1 in, or more. The gap between the electrochemical cells may be from about 0.0625 in to 0.125 in, 0.0625 in to 0.25 in, 0.0625 in to 0.5 in, 0.0625 in to 0.75 in, or 0.0625 in to 1 in. Alternatively, or in addition to, one or more electrically insulating materials may be disposed between the housing of adjacent electrochemical cells (e.g., in a gap between the cells) to electrically isolated one cell from one another (e.g., such that the cells are not in a parallel electrical configuration). The electrically insulating material may be resistant to and stable in high temperatures (e.g., 550° C. and greater), such as firebrick, alumina silicate, ceramic, glass, fiberglass, or other electrically insulating material. The electrochemical cells disposed on the tray may be electrically insulated from the tray using one or more cell-to-tray insulating elements. A cell-to-tray insulating element may be a ceramic material or other heat resistant, electrically insulating material. For example, the cell-to-tray insulating ceramic may comprise firebrick, alumina silicate, ceramic, glass, fiberglass, or any other high temperature and electrically insulating material. The cell-to-tray insulating element may be a flat insulation panel. The flat insulation panel may be positioned between an individual cell on a tray and the tray, between a portion of the cells on a tray and the tray, and/or between all other cells on the tray and the tray. In an example, the cell-to-tray insulation element is a layer disposed between a plurality of cells on the tray and the tray. The cell-to-tray insulating element may be joined to or attached to one or more cells and/or the tray. For example, the cell-to-tray insulating component may comprise a coating or other thin layer of adhesion material to join or attach the cell-to-tray insulating element to the cell(s) and/or tray.

The slot and tab may be used in any high temperature metal weldment application including, but not limited to, the cell level tray assembly, the rack, the external structure and any other system component. The tray may be made of cost-efficient materials. The trays may be configured to use a double support at the ends so that the tray may be removed without the removal device entering the rack. The tray may be easy to assemble. The slot and the tab may be manufactured by using cutting devices. The cutting devices may include, but are not limited to, a scissor, annular cutter, blade, broaching, diagonal pliers, diamond tool, die, edger, saw, laser, nipper, pincer, and razor. The tray elements may be cut on an overhead cutting table. The tray elements may then be bent to form tabs. The cutting devices may not be automated devices. The cutting devices may be automated devices. Cutting devices may permit the slot and tab to be manufactured at low cost relative to other manufacturing methods.

Interconnects

Electrochemical cells may be joined together in series or in parallel on a tray and between trays. Cells connected in series may require the use of a high current and high temperature rated cell-to-cell electrical connections or interconnect(s). The interconnect may be made from material that is stable in air up to or above the operating temperature of the electrochemical cells and may be electrically joined to positive and/or negative terminals of the cells. Cells connected in series may have an interconnect that connects the positive terminal from one cell to a negative terminal of another cell. The interconnect may comprise a material that is rated to operate for long periods of time (e.g., years) at the operating temperature of the cell chemistry (e.g., up to or greater than about 550° C.), and must have a sufficiently high electrical conductivity at the cell operating temperature. The interconnect may comprise a nickel alloy (e.g., Unified Numbering System for Metals and Alloys (USN) #N02201NS), a copper nickel-aluminum bronze alloy (e.g., UNS #C63000), an aluminum brass alloy (e.g., UNS #68700), a copper alloy (UNS #C95400), an aluminum alloy (e.g., UNS #A91100 and UNS #A93003). The interconnect may also comprise material that has high electrical conductivity but is not stable in air at the cell operating temperature, for example, Ni-plated mild steel. The electrical resistance of the interconnect at an operating temperature of the electrochemical cells (e.g., approximately or greater than about 550° C.) may be less than or equal to about $1\times10^{-3}$ Ohm, $1\times10^{-4}$ Ohm, $5\times10^{-5}$ Ohm, $1.5\times10^{-5}$ Ohm, $1\times10^{-5}$ Ohm, $5\times10^{-6}$ Ohm, $1\times10^{-6}$ Ohm, $1\times10^{-7}$ Ohm, $1\times10^{-8}$ Ohm, or less. In an example, the electrical resistance of the interconnect at the operating temperature is less than or equal to about $5\times10^{-5}$ Ohm. In another example, the electrical resistance of the interconnect at the operating temperature is less than or equal to about $1.5\times10^{-5}$ Ohm.

Interconnects may also comprise elements to facilitate forming an electrically conductive connection with a positive or negative terminal on a cell. In some examples, the interconnect is directly brazed or welded to a cell terminal. In another example, the interconnect material may not be compatible with brazing or welding directly to the cell (e.g., due to the formation of mechanically weak braze joints based on using a different material for the interconnect and for the cell terminal). The interconnect may comprise an intermediate element that can be bonded (e.g., welded or brazed) to the primary interconnect material (e.g., the material making up the majority of the interconnect component) and to the cell terminal with sufficient mechanical strength and electrical conductivity required to operate the system at the rated power, current, and operating temperature Insulation In order to maintain safe and efficient operation, the energy storage system may comprise insulation material between the rack and the enclosure. The insulation material may be thermal insulation material. The insulation material may be in powder form. The insulation material may fill the empty volume between the rack and the enclosure. The insulation material may form a homogenous layer without gaps, seams or joints. As the insulation material settles over time or during, it can be topped off. For example, the rack may comprise a rack external cover and the insulation may be disposed between the rack external cover and the enclosure.

Figure 6:
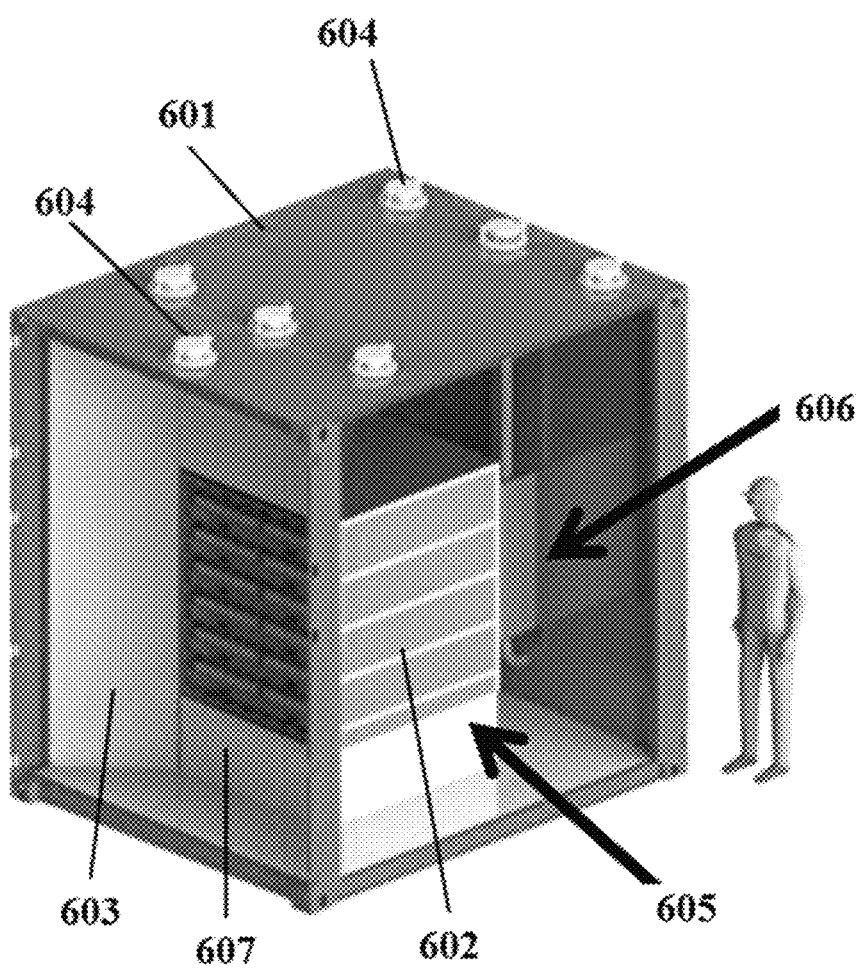
FIG. 6 shows another example of the energy storage system.

The insulation materials may comprise or may be, but are not limited to, silica, microporous silica, alumina silica, alumina silicate, magnesia, vacuum insulated panel, silica aerogel, cementitious foam, perlite loose-fill vermiculite loose-fill, aerated concrete, cellular concrete, brick, glass, poured concrete, fiberglass, and mineral wool or any other thermally insulating materials. The insulation materials may be in powder form. If the insulation materials are in the form of powders, the particle size (e.g., cross-section) of an individual particle in the powder may be at most about 1 centimeter (cm), 1000 micrometers (μm), 500 μm, 400 μm, 300 μm, 200 μm, 100 μm, 50 μm, 10 μm, 1 μm, 0.5 μm, 0.1 μm or smaller. The powder insulation may be made from alumina silicate, silica, or other inorganic materials designed to high temperature use. The powdered insulation materials may be used to fill the air gaps inside the energy storage system. The air gaps may exist when one or more panels are connected to form the one or more insulation sections (e.g., seams where two panels meet, or external layers required by other types of insulation materials). The air gaps may exist because many other insulation materials may comprise of rigid elements that may leave openings at seams or joints between adjacent rigid elements of insulation The energy storage system may further comprise one or more panels between the rack and the enclosure. The one or more panels may be configured to form one or more insulation sections and may be designed to hold powder insulation in certain zones adjacent to a portion of the system that contains the electrochemical cells. FIG. 6 shows and example of an energy storage system with the enclosure front cover and side panel removed. One or more panels 603 may be disposed between the enclose (e.g., walls of the enclosure) and the rack external cover or rack 602. The one or more panels 603 may or may not be attached to the rack or rack external cover 602. The one or more panels 603 may be configured such that the insulation is divided into sections. The insulation sections may comprise a first insulation section 605, a second insulation section 606, and a third insulation section 607. An insulation zone separation panel (not shown in FIG. 6) may be located between the first 605 and second 606 insulation sections. The first insulation section 605 may surround the rack and/or rack external cover and insulate the walls and top of the cells. The first insulation section 605 may be filled first (e.g., prior to deployment or at the deployment location). In an example, the first insulation section 605 may be filled before any cells are installed. The second insulation section 606 may comprise the 'tunnel' at the back of the rack. The second insulation section 606 may insulate around busbars, wires, sense leads, cooling tubes, and argon purge tubes. The insulation materials may fill in all voids and air pockets around these components in the second insulation section 606. The second insulation section 606 may be filled after the first insulation section is filled. During maintenance or repair, the small 'tunnel' volume may be emptied, while the rest of the insulation may not be emptied. The third insulation section 607 may be the next to be filled after all cells are installed. After closing the enclosure font cover, the insulation materials may be filled through ports 604 near the front of the enclosure (e.g., adjacent to the enclosure front cover).

The insulation materials may be disposed in the one or more insulation sections. The one or more insulation sections may be filled with insulation materials. Some insulation sections may be filled with insulation materials prior to system deployment. Some insulation sections through which access is required for installation of cells or wires can be filled with insulation materials after the system is installed at a deployment location. The insulation materials may be filled through a plurality of ports 604 on the top of the enclosure 601. The insulation materials may completely fill any voids and/or displace air spaces. Induced vibration or agitation may be used to allow the insulation materials to settle properly. The insulation materials can be easily removed from the system through vacuum suction and replaced with new insulation materials if thermal properties degrade over time without having to re-install the entire system.

The insulation materials can be disposed in the one or more insulation sections through a plurality of methods. The methods may include pouring the insulation materials into the insulation sections. The insulation materials can be disposed in the one or more insulation sections through one or more pieces of equipment. The one or more pieces of equipment may be gravimetric feeders, storage vessels, mixers, blenders, screeners, crushers, grinders, packaging machines, or any other processing equipment. To remove the insulation materials from the energy storage system, a standard 'shop vacuum,' industrial vacuums, or similar equipment may be used. To assist cooling, additional insulation sections may be introduced. Selected insulation sections may be emptied to assist cooling by reducing the total insulation thickness to increase rate of cooling.

The energy storage system may be designed to include a controls room that is thermally insulated from the hot zone of the container (e.g., where the cells are located). The controls room may be a thermally insulated electronics compartment. The thermally insulated electronics compartment may be disposed internal or external to the enclosure and/or rack. The controls room may comprise one or more control systems, electronics (e.g., battery management system, heater controllers), electrical components (e.g., hot-to-cold sensing/balancing wire and busbar transition, AC distribution, circuit panels, AC and DC disconnects, fuses), communication devices, and other devices (e.g., visual indicators, safety components). The controls room may be thermally controlled using fans to exchange air with the external environment and/or air conditioning.

The rack and/or rack external cover (or any portion thereof) may be configured to interface with one or more panels. The rack and/or rack external cover may comprise one or more specific areas or portions that may act as tethering or harnessing locations for one or more panels mounting. One or more panels may be attached to the rack and/or rack external cover through rigid metallic connections that may be permanently connected (e.g., welded or bonded) to the rack (or any portion thereof). One or more panels may be connected to the rack and/or rack external cover such that the connection points may be removable or replaceable (e.g., to facilitate service access or periodic replacement). One or more panels may be assembled to the rack and/or rack external cover such that the insulation region of the assembly may not create a direct thermal pathway between thermally insulated regions (e.g., a thermally maintained zone of the system) of the assembly, and non-insulated regions of the assembly and/or the surrounding environment.

The rack may be placed on one or more insulation boards in the enclosure. The insulation boards may have various designs, shapes, and/or sizes. Examples of possible shapes or designs include but are not limited to: mathematical shapes (e.g., circular, triangular, square, rectangular, pentagonal, or hexagonal), two-dimensional geometric shapes, multi-dimensional geometric shapes, curves, polygons, polyhedral, other geometric shapes, or partial shapes or combination of shapes thereof. The number of insulation boards may be at least 1, 2, 3, 4, 5, 6, 7, 8, 9, 10 or greater. The insulation boards may be dimensioned to fit in the enclosure. The materials of the insulation board may be, but not limited to, vacuum insulated panel, calcium silicate, cement bonded calcium silicate, cement bonded inorganic silicate, silica aerogel, high density fiberglass batts, rock, rock and slag wool loose-fill, cementitious foam, perlite loose-fill, fiberglass rigid panel, vermiculite loose-fill, aerated concrete, cellular concrete, brick, glass, poured concrete, fiberglass, mineral wool, cellulose, polyurethane foam, polystyrene, or any combination thereof.

Insulation materials may surround the rack and/or rack external cover and/or may be provided on the inside of fluid flow channel(s). Insulation materials may surround the electrochemical cells. Insulation materials inside of a fluid flow channel can provide insulation materials between the thermal transfer fluid and one or more structural portions of the fluid flow channel. The insulation can be distributed in a manner that facilitates thermal management of the system. An amount (e.g., volume, mass, thickness, total insulating capability, etc.) of insulation materials at or in proximity to (e.g., facing) the center of the system/device and/or rack (e.g., at or in proximity to a heated zone) may be less than an amount of insulation materials at or in proximity to the periphery of the system/device and/or rack (e.g., not at or not in proximity to a heated zone, or facing away from the center). For example, the system may comprise insulation along at least a portion of a fluid flow path to aid in removal of heat from a predetermined location within the system. The amount of insulation along any given portion may vary in accordance with location. For example, least amount of insulation may be provided in a location that is in proximity or adjacent to a heated zone.

Insulation materials may be used to prevent heat loss from the cells (e.g., to keep the metal electrodes molten when heat is not being generated from charging or discharging of the cell). The insulation materials may be designed such that it maintains the cells at or above operating temperature for a given period of time (e.g., a finite period of time, such as, for example, at least about 30 minutes, 1 hour, 2 hours, 4 hours, 6 hours, 8 hours, 10 hours, 12 hours, 18 hours, 24 hours, 2 days, 5 days, 10 days, 20 days, 1 month, or more) when the cells are inactive and/or when no supplemental heating power is provided through heaters.

The insulation materials may allow the system to be (e.g., fully) self-heated when operated normally/regularly (e.g., when cycled at least once every 2 days, or with at least 50% of its energy capacity discharged at least every two days). For example, insulation materials may enable the system to operate continuously in the self-heated configuration when charged and discharged (or cycled) at least once every 2 days. In some examples, the normal/regular operation may include cycling (an example of a charge/discharge metric associated with such operation) at least once every 1 hour, 2 hours, 3 hours, 4 hours, 5 hours, 6 hours, 12 hours, 1 day, 2 days, 3 days, 4 days, 5 days, 6 days 1 week, 2 weeks, 3 weeks, 1 month, 2 months, 3 months, 4 months, 5 months, 6 months or more.

At least a portion of components of an energy storage device or system (e.g., electrochemical cells, groups of cells, and one or more racks) may be thermally isolated from other room-temperature components of the energy storage device or system through insulation materials boundaries. Insulation materials can aid in defining thermal barrier(s) that allow one side of a thermal boundary (e.g., thermal boundary comprising the thermal barrier(s)) to be maintained at or above a temperature suitable (e.g., required) for cell operation (e.g., hot zone), while the other side of the thermal boundary can be maintained closer to room temperature or ambient temperature conditions (e.g., cool zone).

Insulation materials may comprise materials with high impedance for heat transfer (also "thermal impedance" herein). Such materials may be packaged in sheets, tiles, wraps, tapes or other (e.g., similar) form factors such that they may be packaged around the high temperature zone (also "hot zone" herein). Different insulation materials may be used in the same energy storage system. For example, one insulation section may utilize a thermal insulator with a first thermal impedance and other insulation sections may comprise materials with one or more different thermal impedances (e.g., a second thermal impedance, a third thermal impedance, and so on). The insulation materials may comprise a set or package of components. In some examples, removable and/or replaceable components (e.g., tiles) may be incorporated into the insulation materials layers. Insulation materials may have dedicated areas, portions, or inlets and outlets (e.g., pass-throughs) through which wires, sensors and/or high current/voltage (e.g., cell current or voltage) connections, collectively referred to as "connections" herein, can pass in order to connect electrochemical cells (e.g., inside the thermal insulation) to other components in the energy storage system (e.g., outside the thermal insulation). For example, pass-throughs may carry wires and/or sensors that are in communication with a management/control system. Such sensors may include, for example, one or more temperature sensors placed in or in thermal communication with the hot zone of the system. In some examples, pass-throughs carry voltage (e.g., low current) sense wires. The voltage sense wires may be designed to handle (e.g., withstand) small amounts of current (e.g., less than about 10 milli-amperes (mA) or less than about 1 mA). Pass-throughs carry voltage sense wires and/or wires for distributing current to/from cells. Pass-throughs carry high current and/or high voltage wires to busbars. Pass-throughs may have a cross-section that is, for example, circular, rectangular, square, oval, or polygonal. Such pass-throughs may have a cross-section area of greater than about 0.0001 square centimeters ($cm^2$), greater than about 0.001 $cm^2$, greater than about 0.01 $cm^2$, greater than about 0.1 $cm^2$, greater than about 1 $cm^2$ or greater than about 10 $cm^2$).

A pass-through may be thermally efficient to limit or prevent excessive heat loss through it. In some cases, the pass-through can be filled with material(s) with high thermal impedance to limit or decrease heat transfer from the hot zone of the system to other lower temperature areas (e.g., to one or more cool zones). The filling material may be homogenous (e.g., one material fills the entire pass-through) or heterogeneous (e.g., two or more different materials are used as fillers in one pass-through). The pass-through can comprise one or more plugs and/or one or more end-caps that may limit or decrease heat transfer through the pass-through. Plug(s) and/or end cap(s) may encapsulate material with high thermal impedance within the pass-through structure. The entire pass-through structure can be mounted on a tile (or sheet, wrap, tape, etc.) of insulation materials such that the tile (or sheet, wrap, tape, etc.) may be removed along with the pass-through as part of service or repair.

The wires that transit the pass-through may comprise special materials (e.g., materials that are stable at or above the operating temperature of the system, oxidation-resistant materials, materials that have suitable (e.g., sufficient and/or high) electrical conductivity at the operating temperature of the system), such as, for example, nickel, aluminum, bronze, brass, stainless steel, or any combination thereof. Such materials may limit or decrease heat-induced corrosion on the wires. The wires in the pass-through may transition (e.g., sequentially) from materials that are stable at higher temperatures, to more electrically conducting but less thermally stable materials (e.g., copper). The wire in the pass-through may comprise at least about 1, 2, 3, 4, 5, 6, 7, 8, 9, 10, 12, 14, 16, 18, 20, 25, 30 or more different sections. The sections may comprise different materials. The sections may be integrally formed, or joined (e.g., welded) together to form a composite wire. In some cases, the materials may be sequentially arranged in order from materials with highest thermal stability (and, in some cases, lower conductivity) in a region of the pass-through adjacent the hot side to materials with highest electrical conductivity (and, in some cases, lower thermal stability) in a region adjacent the cool side.

The pass-through may comprise wires that are built into (e.g., integrally formed with) the pass-through structure. In some cases, different pass-throughs in the system may be designed such that the wire lengths, location of the wires within the pass-through and/or spacing between the wires are the same for the different pass-throughs. In some cases, the pass-through may comprise wires that are floating within the pass-through. In some cases, wires may be cast or set in high thermal impedance material such that wires do not form a straight-line connection between high temperature (e.g., hot) and low temperature (e.g., cold/cool, room temperature) zones of the system. Wires routed in this manner may have excess length incorporated within the pass-through to allow thermal energy conducted by the wires to be released as the wires travel through heterogeneous layers of thermal impedance material within the pass-through. The (actual) length of the wire may be, for example, at least about 1.5 times, at least about 2 times, at least about 5 times, at least about 10 times, at least about 50 times, or at least about 100 times greater than a distance from the hot zone to the cold zone (e.g. length of the pass-through). This may aid with easily and/or safely interconnecting the wires with electronics components, and/or making areas of the system service access/touch safe.

Figure 7:
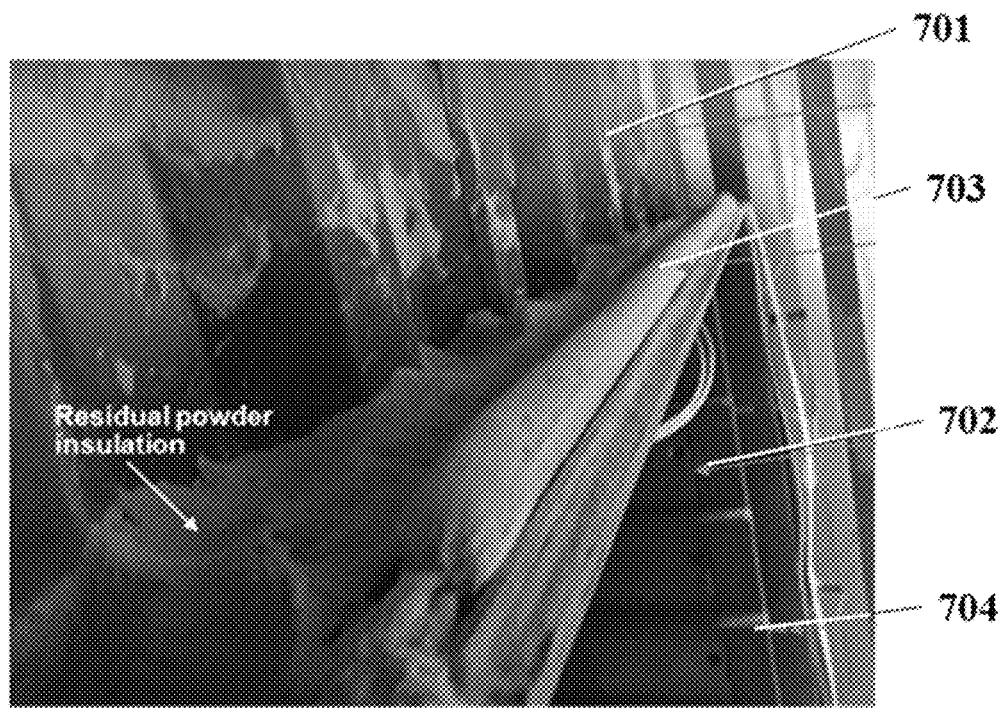
FIG. 7 shows an example of the tube gasket sealed rack.

The energy storage system may comprise one or more insulation components. If the insulation materials are in powdered form, the insulation components may be configured to pack powdered insulation materials so that the powder may not flow through small crevices and/or surround electrochemical cells which can make it difficult to remove and replace cells. The insulation components may be tube gaskets. The rack of the energy storage system may be sealed by one or more tube gaskets. FIG. 7 shows an example of the tube gasket sealed rack. The one or more panels 701 may be connected to the rack 702. The insulation materials may be contained inside the insulation section surrounded by the one or more panels 701. The insulation materials may be in powder form. One or the one or more panels 701 may be a thin sheet metal skin. If the one or more panels are thin sheet metal skins, the metal skins may be attached to the rack using bent features and ribs rather than a full seam weld. Inside the rack, the insulation materials may not filled all the gaps and some leakage can be allowed for a large cost reduction. The one or more panels 701 may be removable. Wherever there is a removable panel, a tube gasket 703 may be used. The tube gasket may be made with woven insulation fabric and insulation materials. The woven insulation fabric may be used to form a tube shaped component with crimped ends. The tube shaped component may be filled with insulation materials. The insulation materials may be in powder form. The tube gasket 703 may be used to 'seal' off the inside of the rack (where the trays of cells are located) from the powder insulation that surrounds the rack while allowing for easy access when required. The rack 702 may also comprise a rack front cover 704. The rack front cover 704 may be configured to seal the racks and trays. The rack front cover 704 may be a thin-walled door hung off the top. The rack front cover 704 may press down on the tube gasket 703 and cover the rack.

The energy storage system disclosure herein may achieve better thermal efficiency, possible reduction in system or operational costs, ease of install, ease of removal, ease of servicing, selective filling certain areas, and/or dynamically varying thermal property of the system to accelerate cooling by selectively removing powder from areas.

Heating System

The rack may comprise one or more heaters for supplying thermal energy to the plurality of electrochemical cells. Heating may be achieved using any form of heaters, such as, for example, electrical resistance heaters that convert electrical energy from a power source (e.g., power generators via the electric power grid, back-up battery system, an on-site power generator such as a diesel generator, renewable power generators such as a wind turbine or a solar power system). Heating can also be provided to the system after it has been heated up in order to manage the temperature of the system during charging, discharging, and/or rest operating modes, or during periods of extended resting or during periods where the battery is charged and/or discharged at power rates below its regular (or normal) or intended operating power rates. When the battery is at, near or above its operating temperature, the battery may maintain an operating temperature by providing power from energy stored within the battery (e.g., the battery may discharge its energy to the heaters). Battery insulation can be designed such that, once heated, the battery retains heat (e.g., in a thermal chamber of the battery) when idle (e.g., when the battery is not charging or discharging). However, during operation, the thermal chamber may in some cases overheat. To regulate the temperature of the device (e.g., the temperature in the device chamber or container) during the cycling period (e.g., when the battery is charging and/or discharging), a thermal management system can be used. As cell components may require heat for operation, the system may be configured such that the cells and/or groups of cells are thermally insulated in excess to trap and retain as much heat as possible, while providing mechanism(s) for natural or forced movement of one or more thermal management fluids to help maintain given (e.g., optimal) thermal boundaries. The mechanism(s) may be activated and enable improved system reliability, performance robustness, and high efficiency operation. The cooling mechanism(s) may comprise activated passive cooling (e.g., opening vents/convection flow channels, opening a vent/valve to allow natural convection to cool the system). The cooling mechanism(s) may comprise active cooling (e.g., starting or increasing a flow of a thermal management fluid). The cooling mechanism may comprise a combination of activated passive cooling and active cooling.

The energy storage system may comprise one or multiple heaters. A heater may be a resistive heater, such as a heating element or heating coil. A heater may be located on the rack, on the rack and adjacent to the insulation, at a location on rack that is near to a location where heat loss is highest (e.g., near a section with a pass through), near to trays in the rack, joined to structural elements of the rack, or joined to the rack external cover. The energy storage system may comprise at least 1, 2, 3, 4, 5, 6, 7, 8, 9, 10, 15, 20, 25, 30, 50, or 100 heaters. Heaters may be integrated into the rack, rack external cover, tray, or other parts of the energy storage system. Heaters may be distributed throughout the heating zone, including adjacent to the electrochemical cells, rack, trays, and/or rack external cover. Heater may be individually addressable (e.g., may be operated independently) or may be addressed as a group (e.g., operated as a group). In an example, blocks of heaters are independently addressable (e.g., sections of heaters are controlled as a group). The heaters may be associated with one or more thermocouples. The heaters may be in communication with the thermal couples such that the heaters turn on or off as a temperature measured by the thermocouples changes. An individual heater may be associated with an individual thermocouple. Alternatively, or in addition to, an individual heater may be associated with multiple thermocouples or an individual thermocouple may be associated with multiple heaters. The thermocouples may be distributed throughout the heating zone and may be disposed adjacent to the rack, trays, and/or electrochemical cells.

The energy storage system may be designed to allow for simple removal, servicing, and/or replacement of the heaters and/or thermocouples. Removal, servicing and/or replacement of the heaters and/or thermocouples may occur while the system is near the operating temperature. Removal, servicing and/or replacement of the heaters and/or thermocouples may occur without cooling the system to near ambient temperature. Removal, servicing and/or replacement of the heaters and/or thermocouples may occur without removing trays and/or electrochemical cells from the system. In an example, the one or more sections of insulation may be removed and the heaters and thermocouples may be serviced from the section without insulation.

Figure 8:
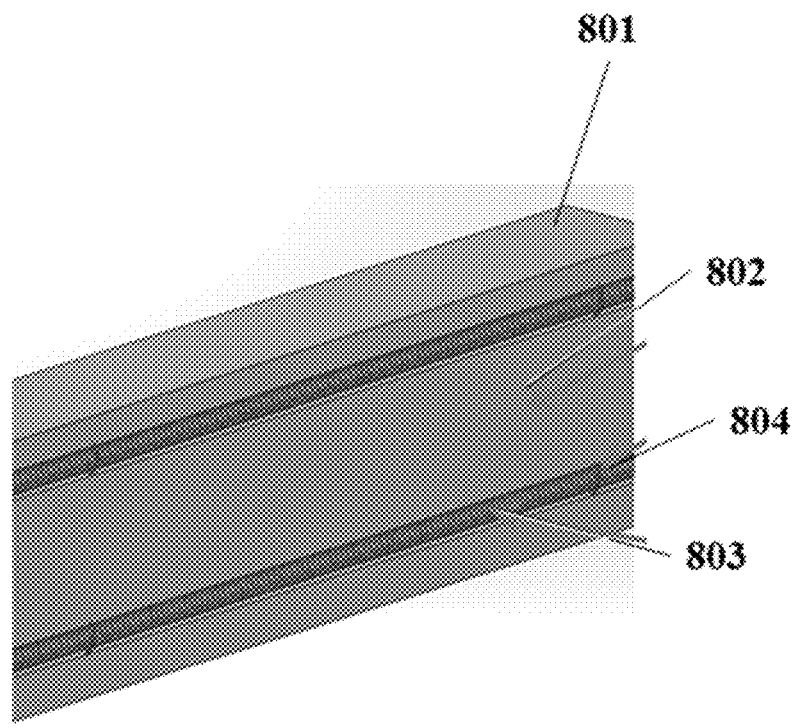
FIG. 8 shows an example of a part of a heater.

FIG. 8 shows an example of a part of a heater. The heater 801 may comprise an insulation wall 802. The insulation wall 802 may be made of firebricks (e.g., comprising silicate, aluminum silicate, calcium silicate, lime, or magnesia). The heater may also comprise one or more heater coils 803. The firebricks may be used to support the heater coils 803. For example, the insulation or insulator may comprise one or more grooves or channels. The grooves or channels may be configured to hold one or more heating wires. Due to expansion, the firebrick may serve as a channel to hold the movement of the heater coils without forcing undo stress on the heat coil. The heater coil may be fixed by one or more mounting wires 804. The mounting wires 804 may be metal clips. To allow the heater coil to move in between, the mounting wires 804 may be spaced at least about every 0.1 inches, 1 inch, 2 inches, 3 inches, 4 inches, 5 inches, 6 inches, 7 inches, 8 inches, 9 inches, 10 inches, 11 inches, 12 inches or greater. The heater coils may be targeted to specific locations required for adjusting thermal gradients as well as a high power heat up system. The heater coil may have a circuitous (e.g., zigzag, spiral or helix) pattern or path (through the pass-through). The rate of heat conducted through one or more heater coils may be related to or depend on one or more of: the cross-sectional area of the heater coil(s), the thermal or electrical conductivity of the material(s) of the heater coil(s), and the inverse of the length of the heater coil(s). In some cases, further reducing the cross-sectional area may result in a mechanically fragile heater coil wire that is susceptible to breaking and/or oxidation. The heater coil may be configured in a helical coil, such as, for example, a wire that spirals in a circular geometric path from the rack to the insulation material or a cold zone. The axis of the helical structural can be about parallel (e.g., substantially parallel) to the direction of the heat flow path from the rack to the insulation material or a cold zone. The heater coil may be configured in other geometries, such as, for example, a helical-type geometry with an oval, square, rectangular, polygon, and/or other cross-sectional shape.

Figure 9:
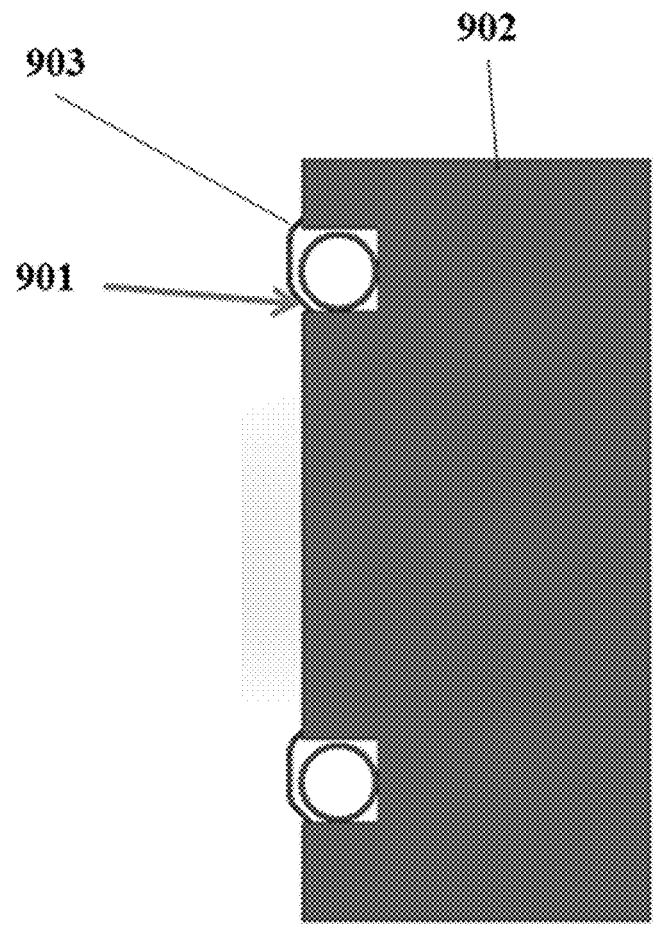
FIG. 9 shows an example of a side view of the part of the heater of FIG. 8.
Figure 10:
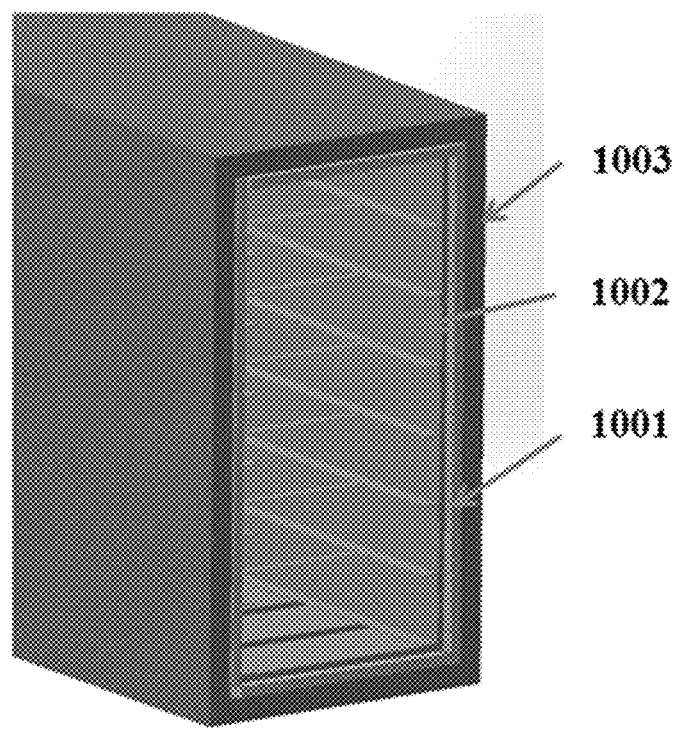
FIG. 10 shows an example of the heater placed around a rack.

FIG. 9 shows an example of a side view of the part of the heater of FIG. 8. The mounting wire 903 may be cast or glued into the insulation wall 902 on one end 901 and bent during the install. The heaters may be placed around the one or more racks. The heater may be placed around the rack. FIG. 10 shows an example of the heater placed around a rack. The heater may be placed around the rack 1002. The heater may be placed around the rack external cover 1001. The insulation material 1003 may be placed in proximity of the heater. The heater may serve as both the high voltage AC isolation material to keep the heater coil isolated from both the electrochemical cells and the outer skin of the rack.

Thermal Ballasts

The thermal characteristics of the electrochemical cells and/or energy storage system and the operating conditions (e.g., the frequency and duration of operation, the power use profile) may make it challenging to maintain the cells within an operating temperature window. In some examples, the system may be designed to include elements that serve to retain or absorb large amounts of thermal energy, such as thermal ballasts. A thermal ballast may retain or absorb large amounts of thermal energy at or near the operating temperature of the system, thereby allowing the system to remain in a narrower operating temperature window without actively cooling or heating the system. Such thermal ballasts may involve the use of materials that undergo a phase change (e.g., freezing or melting) at or near the lower end of the operating temperature window of the cells. Thus, if the cells begin to cool to a temperature at or below a phase change temperature (e.g., the freezing point of the liquid), the thermal ballasts may release heat to aid in maintaining the temperature at or near the phase change temperature of the material, thus, maintaining the cells at or above a minimum operating temperature. Similarly, the thermal ballast may have a phase change temperature (e.g., a melting point) near or just slightly below a maximum operating temperature of the cells, and if the cells heat (e.g., due to the manner in which they are being operated) the thermal ballast may undergo a phase change (e.g., melting) and absorb heat, thereby maintaining the temperature of the cells to within an acceptable operating temperature range. Thermal ballasts may have a range over which phase change may occur, such as an off-eutectic salt mixture, which would cause the thermal ballast to continuously release or absorb heat over a range of temperatures. In an example, the range of temperature may completely or partially overlap with operating range of the cells. The thermal ballast (e.g., off-eutectic salt mixture) may be a liquid near an upper operating temperature of the cells. The thermal ballast may at least partially freeze to form a two phase mixture as the operating temperature is decreased to below the upper operating temperature. The thermal ballast may be a solid near a lower operating temperature of the cells. The lower operating temperature of the electrochemical cells may align with the eutectic melting point of the thermal ballast.

Thermal ballasts may comprise a material that undergoes a phase transition upon application of a large amount of energy per unit mass. The energy per unit mass to produce a phase transition of the material of the thermal ballast may be greater than or equal to about 10 joules/gram (J/g), 20 J/g, 50 J/g, 100 J/g, 200 J/g, 500 J/g, 1000 J/g, or more. The phase change material may be a combination of one or more salts, including chlorides, bromides, hydroxides, carbonates, such as magnesium chloride ($MgCl_2$), calcium chloride ($CaCl_2$), lithium chloride (LiCl), sodium chloride (NaCl), potassium chloride (KCl), magnesium hydroxide ($Mg(OH)_2$), calcium hydroxide ($Ca(OH)_2$), sodium hydroxide (NaOH), potassium hydroxide (KOH), sodium carbonate ($Na_2CO_3$), potassium carbonate ($K_2CO_3$), magnesium carbonate ($MgCO_3$), lithium carbonate ($Li_2CO_3$), or calcium carbonate ($CaCO_3$).

Thermal ballasts may be held within sealed elements within the system. The sealed element may also serve other functions in the system. In some examples, the structural elements of the tray or rack may also serve as a sealed element in which the thermal ballast material is held and sealed within. Alternatively, or in addition to, the sealed element comprising the thermal ballasts may be disposed adjacent to the rack in one or more locations. For example, the sealed elements may be disposed adjacent to one or more structural elements (e.g., runners, rails, and/or cross-structural members) of the rack or tray.

Safety Features

The energy storage system may comprise safety features to reduce the risk of potential harm, injury, or damage to equipment in the event of a failure of one or more components within the energy storage system. Safety features may include one or more of manual or remotely accessible AC and/or DC disconnect switches, external port(s) that provide a fluid flow path from outside the container to inside the hot zone (e.g., where the cells are located), a venting port at the top of the container to allow for the escape of smoke or other hazardous gases (including hydrogen), and/or a control system that is designed to detect an electrical, thermal, or other hazard and take actions to reduce the electrical, thermal, and/or chemical hazards of the energy storage system. The manual or remotely accessible disconnect switches may permit the energy storage device to be disconnected from an electrical grid or any other source of electrical energy to prevent the energy storage device from charging or discharging electrical energy. The external port(s) may provide a fluid flow path to permit water or other fluid to enter the enclosure. The water or other fluid may reduce, prevent, or stop a reaction from occurring within the enclosure, for example, in the event of rupture or one or more electrochemical cells. The fluid may include water or fire suppression liquids, foams, or gels. The energy storage system may include at least 1, 2, 3, 4, 5, 6, 8, 10, 1, 15, 20, or more external port(s). The ports may be connectable to a firehose or other source of water or fluid in the event of fire, heat, smoke generation, or another hazardous event. The energy storage system may comprise at least 1, 2, 3, 4, 5, 6, 8, 10, 1, 15, 20, or more venting port(s). The venting ports may include a rupture disc and/or a plug of thermal insulation. The rupture disc may seal the vent when the pressure of the system is below a pressure threshold and may rupture when the pressure of the system is above a pressure threshold. The pressure threshold (e.g., relative pressure inside the system versus ambient air pressure) may be less than or equal to about 5 atmospheres (atm), 4 atm, 3 atm, 2 atm, 1.5 atm, 1 atm, 0.5 atm, 0.25 atm, 0.1 atm, 0.05 atm, 0.01 atm, or less. In an example, the rupture disc may rupture when the pressure of the system is above about 0.1 atmospheres. The venting port(s) may further comprise thermal insulation to minimize and/or prevent heat loss during normal operation. The control system may automatically disconnect electrical connections within the system, automatically turn on an air blower connected to thermal fluid flow paths to cool the system down, and/or stop or limit the rate of charging or discharging of the system.

The energy storage system may also comprise failure tolerant safety indicators, such as temperature sensors or indicators that provide an indication of the internal temperature of the system or show if the system has live electrical hazards (e.g., AC or DC electrical hazards). The failure tolerant safety indicators may not use electrical power provided by the grid or the battery (e.g., the indicators may be self-contained and comprise an independent energy source). The system may include a single type of safety indicator (e.g., temperature sensor) or may include multiple types of safety indicators. The system may include redundant safety indicators.

The energy storage system may also comprise a ventilation and filtration system. The ventilation and filtration system may be configured to ventilate (e.g., release air from or recycle air through) the energy storage system when certain conditions are met. For example, the ventilation and filtration system may ventilate the energy storage system when the temperature of the energy storage system exceeds a threshold temperature. The threshold temperature may be at least about 200° C., 250° C., 300° C., 350° C., 400° C., 450° C., 500° C., 550° C., 600° C., or more. Additionally or alternatively, the ventilation and filtration system may ventilate the energy storage system upon the breach of a cell. In the case of a cell breach, salt vapors (e.g., $MgCl_2$, $CaCl_2$, LiCl, NaCl, KCl) released from the cell may react with atmospheric water vapor and oxygen to form hazardous hydrogen chloride or chlorine gas. The ventilation and filtration system may remove or reduce the concentration of such gases, thereby reducing the risk that any operator is exposed to such gases. The ventilation and filtration system may be disposed between the cells and venting ports of the energy storage system so that any air released from the energy storage system is filtered. The energy storage system may comprise a backup battery that is configured to provide power to the ventilation system during a power outage.

The filtration system may comprise one or more blower fans. The blower fans may force air in the vicinity of the cells into the filtration system. The blower fans may also force air out of the filtration system to the venting ports of the energy storage system, where the air may then be expelled from the energy storage system. In some cases, the blower fans may be configured to circulate hot, filtered air out of the energy storage system and fresh air from the environment into the energy storage system.

The filtration portion of the filtration system may comprise an activated carbon filter. The activated carbon filter may be impregnated with acid and chlorine neutralizing compounds such as potassium hydroxide and potassium iodide, for example. The filtration system may also comprise a high-efficiency particulate absorbing (HEPA) filter. The HEPA filter may be made of a mat of randomly arranged fibers (e.g., fiberglass fibers) that filter solid particles in any vapors released from the cell during a breach.

Shipping and Site Installation

The energy storage system may include design features that facilitate simple on-site installation. The energy storage system may be designed to weigh less than about 30 metric tons to allow it to be more easily transported via road, rail, or sea. The energy storage system may be designed with permanent or removable features to allow it to be transported without causing mechanical/vibrational damage to any of its components. The system may be designed to have certain sensitive components, such as the electronics, rack(s), insulation, and/or trays, to be installed on-site after the enclosure has been delivered and installed.

The energy storage system may also be designed to be placed on a pre-prepared surface, such as a concrete slab, leveled layer of gravel, etc. The pre-prepared surface may include electrical wiring or other aspects to facilitate simple installation and commissioning of the systems at a customer site.

The enclosure may be designed to have features that permit it to be lifted off of a transportation vessel (e.g., transport truck, transport ship, or train), such as mechanical connections at the top, sides, and/or near the bottom of the enclosure to allow the enclosure to be lifted off the transportation vessel using a crane or a fork lift.

Computer Systems

Figure 11:
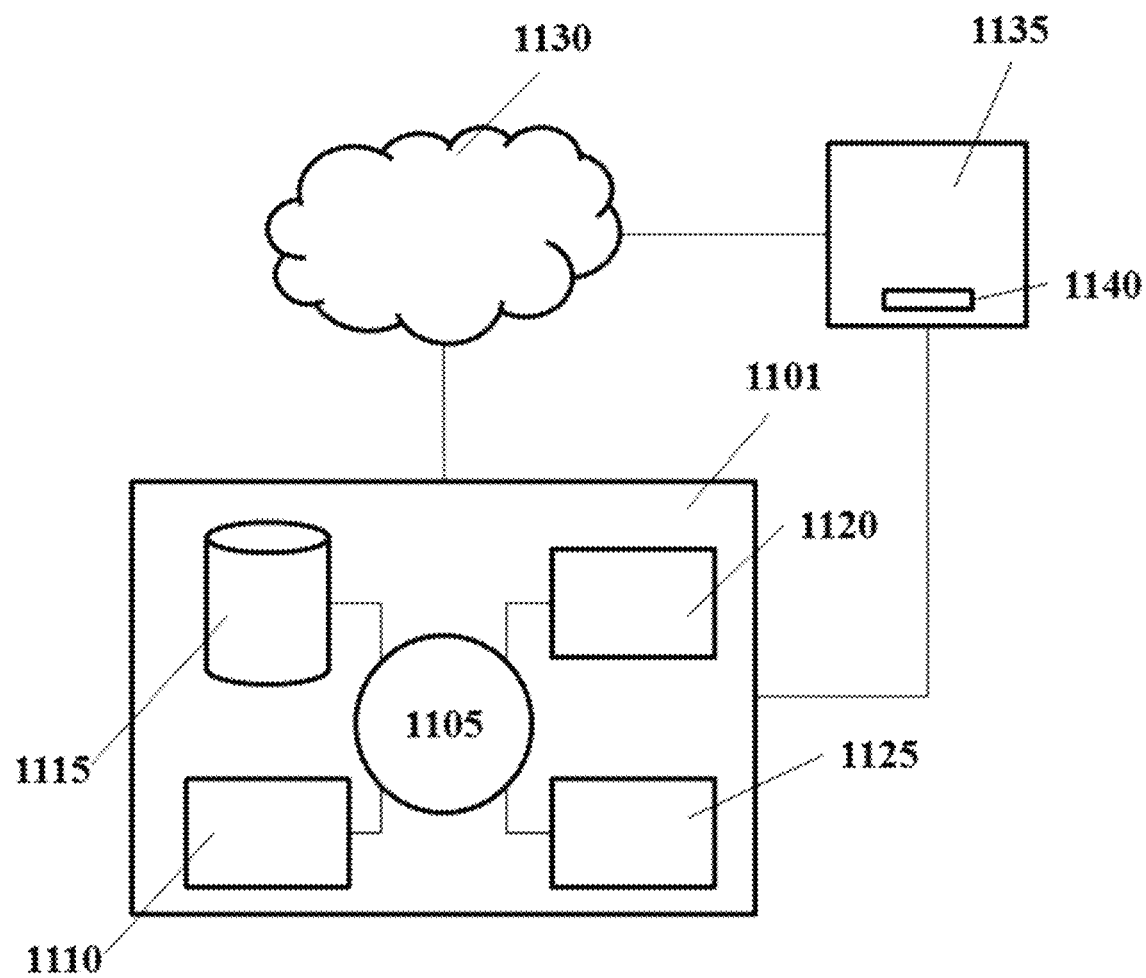
FIG. 11 shows a computer system that is programmed or otherwise configured to implement devices, systems and methods of the present disclosure.

The present disclosure provides computer systems that are programmed to implement methods of the disclosure. FIG. 11 shows a computer system 1101 that is programmed or otherwise configured to control the energy storage system. The computer system 1101 can regulate various aspects of energy storage system of the present disclosure, such as, for example, the operation time, the power, and/or the temperature of the energy storage system. The computer system 1101 can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, control of the energy storage system. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1105. The algorithm can, for example, change the temperature of the system, change the running time of the system, and change the power supplied by the system.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An energy storage system, comprising:
   a plurality of electrochemical cells, wherein an electrochemical cell of said plurality of electrochemical cells comprises a negative electrode, electrolyte and positive electrode, wherein at least two of said negative electrode, said electrolyte and said positive electrode are in a liquid state at an operating temperature of said electrochemical cell, and wherein said plurality of electrochemical cells are connected in series or parallel;
   a rack supporting said plurality of electrochemical cells, wherein said rack comprises a plurality of trays, and wherein a tray of said plurality of trays comprises one or more support units that are not coupled to any other support units via fasteners;
   an enclosure, wherein said rack is disposed inside said enclosure; and
   insulation material disposed between said rack and said enclosure, wherein said insulation material is in powder form.

2. The energy storage system of claim 1, wherein said enclosure comprises a plurality of racks, which plurality of racks comprises said rack.

3. The energy storage system of claim 1, wherein said enclosure further comprises an enclosure external cover, and wherein said enclosure external cover is electrically isolated from said rack.

4. The energy storage system of claim 1, wherein said rack is placed on one or more insulation boards in said enclosure.

5. The energy storage system of claim 1, wherein said rack further comprises a rack external cover, and wherein said rack external cover is electrically connected to said rack.

6. The energy storage system of claim 3, wherein said enclosure external cover comprises a removable front cover.

7. The energy storage system of claim 1, wherein one or more of said plurality of electrochemical cells are disposed on said tray.

8. The energy storage system of claim 1, wherein at least a portion of said one or more support units are a plurality of cross-sectional support members configured to support said plurality of electrochemical cells.

9. The energy storage system of claim 1, wherein an aspect ratio of said tray is less than or equal to about 0.5.

10. The energy storage system of claim 1, wherein said rack comprises one or more heaters configured to supply thermal energy to said plurality of electrochemical cells.

11. The energy storage system of claim 10, wherein said one or more heaters are disposed on an inside of said rack or adjacent to a pass-through of said rack.

12. The energy storage system of claim 10, wherein said one or more heaters comprise an insulator and a heating wire, and wherein said heating wire is disposed in a groove of said insulator.

13. The energy storage system of claim 1, wherein said system comprises one or more safety features selected from the group consisting of external ports configured to permit flow of a fluid, venting ports configured to permit release of flow of gases from said rack, and failure tolerant safety indicators.

14. The energy storage system of claim 1, wherein said rack or said tray is configured to flow a cooling fluid through one or more elements of said rack or said tray.

15. The energy storage system of claim 1, wherein said plurality of electrochemical cells are connected via interconnects configured to maintain an electrical resistance of less than or equal to about $5 \times 10^{-5}$ Ohm at said operating temperature.

16. The energy storage system of claim 1, wherein said plurality of electrochemical cells are connected in both series and in parallel.

17. The energy storage system of claim 5, wherein said rack external cover comprises a removable front cover.

* * * * *